(12) United States Patent
Morita et al.

(10) Patent No.: US 8,707,944 B2
(45) Date of Patent: Apr. 29, 2014

(54) SAW WIRE

(75) Inventors: Mitsuru Morita, Tokyo (JP); Toshimi Tarui, Tokyo (JP); Hiroaki Sakamoto, Tokyo (JP); Hirokatsu Yashiro, Tokyo (JP); Makoto Kosaka, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 46 days.

(21) Appl. No.: 13/504,896

(22) PCT Filed: Jun. 14, 2011

(86) PCT No.: PCT/JP2011/063603
§ 371 (c)(1),
(2), (4) Date: Apr. 27, 2012

(87) PCT Pub. No.: WO2011/158834
PCT Pub. Date: Dec. 22, 2011

(65) Prior Publication Data
US 2012/0216787 A1 Aug. 30, 2012

(30) Foreign Application Priority Data
Jun. 15, 2010 (JP) .................................. 2010-136249

(51) Int. Cl.
B28D 1/08 (2006.01)
(52) U.S. Cl.
USPC .......................................... 125/21; 125/16.02
(58) Field of Classification Search
USPC ............................ 125/21, 16.02; 51/307, 309
See application file for complete search history.

(56) References Cited

U.S. PATENT DOCUMENTS 6,102,024 A 8/2000 Buljan et al.

FOREIGN PATENT DOCUMENTS

| JP | 62-193777 A | 8/1987 |
| JP | 4-4105 B2 | 1/1992 |
| JP | 5-200667 A | 8/1993 |
| JP | 6-91538 A | 4/1994 |
| JP | 7-227766 A | 8/1995 |
| JP | 2001-198790 A | 7/2001 |
| JP | 2002-212676 A | 7/2002 |
| JP | 2002-256391 A | 9/2002 |
| JP | 2002-361566 A | 12/2002 |
| JP | 2004-204277 A | 7/2004 |
| JP | 2004-261889 A | 9/2004 |
| JP | 2006-7387 A | 1/2006 |
| JP | 2007-61976 A | 3/2007 |
| JP | 4008660 B2 | 11/2007 |
| JP | 2008-221406 A | 9/2008 |
| JP | 2009-66689 A | 4/2009 |
| JP | 2009-131871 A | 6/2009 |
| JP | 2009-131872 A | 6/2009 |

(Continued)

OTHER PUBLICATIONS

Chinese Office Action, dated Apr. 15, 2013, for Patent Application No. 201180005181.1.

(Continued)

*Primary Examiner* — Robert Rose
(74) *Attorney, Agent, or Firm* — Birch, Stewart, Kolasch & Birch, LLP

(57) ABSTRACT

A saw wire includes a steel wire (11) having a steel strand (11*a*) with predetermined composition, an abrasive (13) fixed to the steel wire (11) by a fixing part (12), and an intermetallic compound (15) on an interface between the abrasive (13) and the fixing part (12). Tensile strength of the steel strand (11) is 3500 MPa or more, and the fixing part (12) includes a Sn-based solder containing Zn or Ag.

16 Claims, 6 Drawing Sheets

(56) References Cited

FOREIGN PATENT DOCUMENTS

| | | |
|---|---|---|
| JP | 2010-584 A | 1/2010 |
| JP | 2010-23224 A | 2/2010 |
| JP | 2010-201602 A | 9/2010 |
| WO | WO 2009/084811 A1 | 7/2009 |

OTHER PUBLICATIONS

International Search Report for PCT/JP2011/063603 dated Aug. 23, 2011.

5μm

5μm

5μm

5μm

SAW WIRE

TECHNICAL FIELD

The present invention relates to a saw wire suitable for cutting a semiconductor material and the like.

BACKGROUND ART

A saw wire is used for cutting Si single crystal, Si polycrystal, sapphire, SiC single crystal, and the like. As the saw wire, a free-abrasive saw wire and a fixed-abrasive saw wire are known. The fixed-abrasive saw wire has advantages that, compared with the free-abrasive saw wire, it is capable of higher-speed cutting, produces a less cutting margin loss (kerf loss), and does not easily cause environmental pollution.

The fixed abrasive saw wires include one in which diamond abrasive is fixed to a steel wire for saw wire by Ni-electrodeposition (Ni-electrodeposited saw wire), another one in which diamond abrasive is fixed to a steel wire for saw wire by resin (resin fixing-type saw wire), another in which diamond abrasive is fixed to a steel wire for saw wire by a brazing material or a solder, and the like. For example, Patent Literature 4 describes a diamond-covered wire in which a Cu-plated diamond abrasive is fixed to an Inconel 1718 wire with a Sn—Ag—Cu-based solder.

The manufacture of the Ni-electrodeposited saw wire requires a great cost. The resin fixing-type saw wire cannot provide sufficient cutting performance because the resin does not have sufficient strength for fixing the diamond abrasive. Further, the fixed-abrasive saw wire in which diamond abrasive is fixed to the steel wire for saw wire by the brazing material or the solder cannot provide sufficient cutting performance either because strength for fixing the diamond abrasive is insufficient. Here, what are important as the cutting performance are a high cutting speed, a small cutting margin loss (kerf loss), small warpage of a wafer, and the like.

CITATION LIST

Patent Literature

Patent Literature 1: Japanese Examined Patent Application Publication No. 04-4105
Patent Literature 2: Japanese Laid-open Patent Publication No. 07-227766
Patent Literature 3: Japanese Laid-open Patent Publication No. 2006-7387
Patent Literature 4: Japanese Patent No. 4008660
Patent Literature 5: Japanese Laid-open Patent Publication No. 2010-201602
Patent Literature 6: Japanese Laid-open Patent Publication No. 05-200667
Patent Literature 7: Japanese Laid-open Patent Publication No. 2002-256391

SUMMARY OF INVENTION

Technical Problem

It is an object of the present invention to provide a saw wire capable of providing improved cutting performance.

Solution to Problem

To improve cutting performance of a fixed-abrasive saw wire, it is important to use a high-strength, high-tension steel wire and firmly fix an abrasive to the high-tension steel wire. After studious studies, the present inventors have found out that in order to firmly fix an abrasive to a thin high-tension steel wire, it is important that a material used for a fixing part has a relatively low melting point. On the other hand, when a high-melting-point material is used, for example, when brazing with a high-melting-point brazing material is performed, a high-tension steel wire, which has already been highly strengthened by processing, for example, a steel cord or the like, softens during the brazing. Further, when a high-melting-point brazing material such as a Ni alloy is formed by electrolytic plating, it is necessary to form a plating layer with a thickness of at least 10 μm or more in order to fix an abrasive having a several tens μm diameter, resulting in a process requiring a long time and high cost.

Also important is that, while a material whose melting point is relatively low is used for the fixing part, bonding strength between the high-tension steel wire and the fixing part, strength of the fixing part itself, and bonding strength between the fixing part and the abrasive are increased.

As a result of further studious studies based on the above findings, the present inventors have found out that it is possible to improve cutting performance of a saw wire by using a predetermined material for a fixing part and providing an intermetallic compound between the fixing part and an abrasive. The intermetallic compound enables a further improvement in the strength for fixing the abrasive, which can prevent the exfoliation of the abrasive during the cutting.

The gist of the present invention is as follows.

(1)
A saw wire including:
a steel wire having a steel strand;
an abrasive fixed to the steel wire by a fixing part; and
an intermetallic compound on an interface between the abrasive and the fixing part, wherein:
the steel strand contains, in mass %,
C: 0.8% to 1.2%,
Si: 0.02% to 2.0%,
Mn: 0.1% to 1.0%,
Cr: 0.5% or less,
P: 0.015% or less,
S: 0.015% or less, and
N: 0.01% or less,
with the balance being Fe and an inevitable impurity;
tensile strength of the steel strand is 3500 MPa or more; and
the fixing part includes an Sn-based solder containing Zn or Ag.

(2)
The saw wire according to (1), wherein the steel strand further contains, in mass %, at least one kind selected from a group consisting of
Ni: 1.0% or less,
Cu: 0.5% or less,
Mo: 0.5% or less,
V: 0.5% or less, and
B: 0.0050% or less.

(3)
The saw wire according to (1) or (2), wherein the steel wire includes a plating layer on a surface of the steel strand and containing at least one of Zn and Cu.

(4)
The saw wire according to (3), wherein the plating layer gets into the steel strand.

(5)
The saw wire according to (4), wherein a getting depth of the plating layer into the steel strand is 0.5 μm to 5 μm.

(6)

The saw wire according to any one of (1) to (5), including a covering layer on a surface of the abrasive and including a layer of Ni or Cu.

(7)

The saw wire according to (6), wherein the covering layer comprises a base layer of Ti or Cr provided closer to the abrasive than the layer of Ni or Cu is.

(8)

The saw wire according to (1) to (7), including a covering layer on a surface of the abrasive and including a layer of Ni, wherein the Sn-based solder is a Sn—Ag-based solder containing 0.5 mass % to 5.0 mass % Ag, and the intermetallic compound contains Sn.

(9)

The saw wire according to (8), wherein the Sn—Ag-based solder contains a $Ag_3Sn$-based intermetallic compound dispersed in a matrix of the Sn—Ag-based solder and having a plate shape with a 1 μm to 2 μm thickness or a string shape with a 1 μm to 2 μm diameter.

(10)

The saw wire according to (8) or (9), wherein the Sn—Ag-based solder further contains at least one of Fe: 0.01 mass % to 0.5 mass % and Ni: 0.01 mass % to 0.5 mass %.

(11)

The saw wire according to any one of (8) to (10), wherein the intermetallic compound further contains Ni.

(12)

The saw wire according to (11), wherein composition of the intermetallic compound is expressed by $Ni_3Sn_4$, $Ni_3Sn_2$, or $Sn_{(1-x-y)}Ni_xCu_y$ ($0.1 \le x \le 0.7$, $0.01 \le y \le 0.5$).

(13)

The saw wire according to (1) to (7), wherein the Sn-based solder is a Sn—Zn-based solder containing Zn, and the intermetallic compound contains at least one of Sn and Zn.

(14)

The saw wire according to (13), wherein a content of Zn in the Sn—Zn-based solder is 1 mass % to 35 mass %.

(15)

The saw wire according to (13) or (14), wherein composition of the Sn—Zn-based solder is expressed by Sn—Zn—X, X is at least one kind selected from Bi, Ni, Cu, Fe, Sb, Pb, In, and Ag, and a content of the X is 0.5 mass % to 5 mass %.

(16)

The saw wire according to any one of (13) to (15), wherein the intermetallic compound contains at least one kind selected from a group consisting of a Ni—Sn-based intermetallic compound, a Ni—Zn-based intermetallic compound, a Ni—Sn—Zn-based intermetallic compound, a Cu—Sn-based intermetallic compound, a Cu—Sn—Zn-based intermetallic compound, and a Cu—Zn-based intermetallic compound.

(17)

The saw wire according to any one of (13) to (16), wherein the Sn—Zn-based solder includes a Zn precipitate in a plate shape or a needle shape dispersed in a matrix of the Sn—Zn-based solder.

Advantageous Effects of Invention

According to the present invention, it is possible to increase a holding force of an abrasive with ease and at low cost and improve cutting performance.

DESCRIPTION OF EMBODIMENTS

Figure 1A:
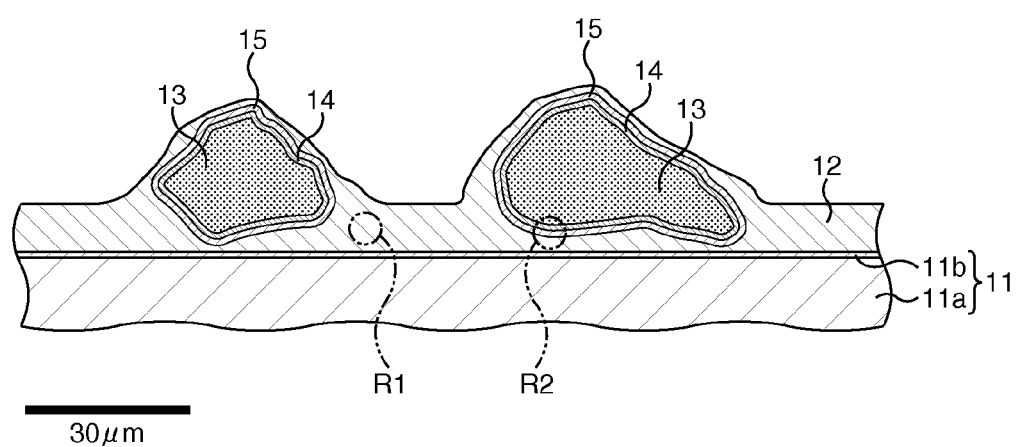
FIG. 1A is a cross-sectional view illustrating a saw wire according to an embodiment of the present invention.
Figure 1B:
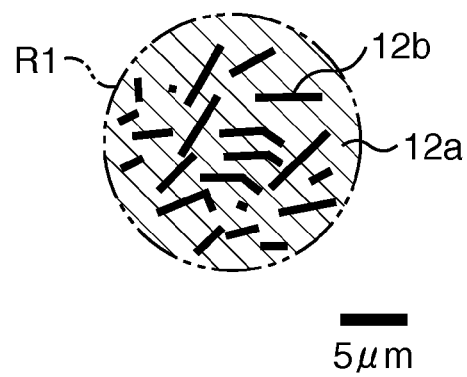
FIG. 1B is an enlarged view of a region R1 in FIG. 1A.
Figure 1C:
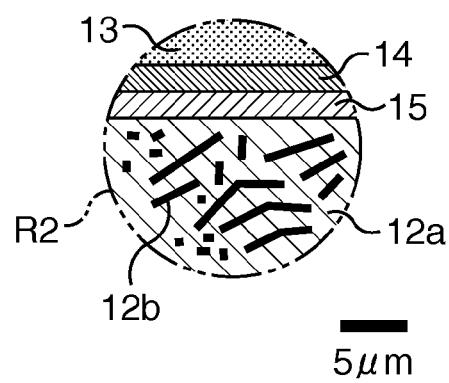
FIG. 1C is an enlarged view of a region R2 in FIG. 1A.
Figure 1D:
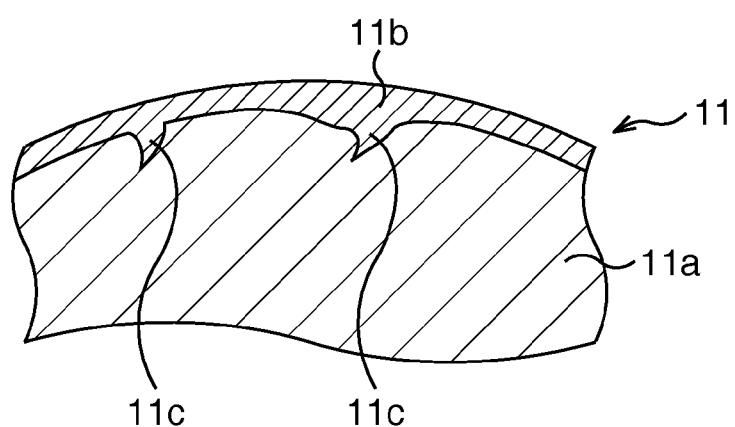
FIG. 1D is another cross-sectional view illustrating the saw wire according to the embodiment of the present invention.

Hereinafter, an embodiment of the present invention will be described in detail with reference to the attached drawings. It should be noted that the embodiment is intended for the detailed description with the aim of providing better understanding of the spirit of the saw wire according to the present invention, and the present invention is not limited to the embodiment. FIG. 1A is a cross-sectional view illustrating a saw wire according to an embodiment of the present invention and illustrates a cross section parallel to a wire drawing direction (longitudinal direction) of the saw wire. FIG. 1B is an enlarged view of a region R1 in FIG. 1A, and FIG. 1C is an enlarged view of a region R2 in FIG. 1A. FIG. 1D is a cross-sectional view illustrating the saw wire according to the embodiment of the present invention and illustrates a cross section perpendicular to the wire drawing direction (longitudinal direction) of the saw wire.

A saw wire 10 according to the embodiment of the present invention includes a steel wire 11 and an abrasive 13 fixed to the steel wire 11 by a fixing part 12. The steel wire 11 includes a steel strand 11a and a plating layer 11b formed on a surface of the steel strand 11a. The fixing part 12 may be composed of an Sn-based solder containing Ag or an Sn-based solder containing Zn, and the solder includes a solder matrix 12a and a dispersion substance 12b dispersed therein. The abrasive 13 is covered with a covering layer 14 and an intermetallic compound layer 15, for example, and the covering layer 14 and the intermetallic compound layer 15 are also covered with the fixing part 12.

<Steel Wire 11>

Here, the steel wire 11 will be described.

Tensile strength of the steel wire 11 is 3500 MPa or more. When a cutting machine such as a multi-wire saw is used to cut out a large number of thin wafers at a time, it is important to prevent warpage of the wafers that are cut out. Tension of the saw wire has a great influence on the occurrence of the warpage of the wafers. Specifically, when the saw wire is not tensed sufficiently at the time of the cutting, the saw wire greatly bends, which lowers planarity of cut surfaces of the wafers and thus is likely to cause the warpage. Therefore, it is important to strongly tense the saw wire at the time of the cutting, but when tensile strength of the saw wire is low, wire breakage is likely to occur. Therefore, in this embodiment, tensile strength of the steel wire 11 is 3500 MPa or more. The steel wire 11 is desirable also in view of price. Note that, depending on strength required of the saw wire 10, tensile strength of the steel wire 11 is desirably 3800 MPa or more, more desirably 4000 MPa or more, and still more desirably 4500 MPa or more.

The steel strand 11a of the steel wire 11 contains in mass % C: 0.8% to 1.2%, Si: 0.02% to 2.0%, Mn: 0.1% to 1.0%, Cr: 0.5% or less, P: 0.015% or less, S: 0.015% or less, and N: 0.01% or less, with the balance being Fe and an inevitable impurity.

[Carbon (C): 0.8% to 1.2%]

C is an element indispensable for obtaining sufficient tensile strength. When a content of C is less than 0.8%, it is difficult to obtain the tensile strength of 3500 MPa or more. On the other hand, when the content of C is over 1.2%, proeutectoid cementite precipitates in an austenite grain boundary to deteriorate wire drawability. Therefore, the content of C is 0.8% to 1.2%.

[Silicon (Si): 0.02% to 2.0%]

Si is an element indispensable for strengthening ferrite to improve tensile strength and for deoxidizing steel. When a content of Si is less than 0.02%, the above effects is insufficient. Further, when the content of Si is over 2.0%, a hard $SiO_2$-based inclusion that deteriorates wire drawability is generated. Therefore, the content of Si is 0.02% to 2.0%.

[Mn (Manganese): 0.1% to 1.0%]

Mn is necessary for deoxidation and desulfurization, and is an element indispensable for enhancing hardenability to increase tensile strength. When a content of Mn is less than 0.1%, the above effects is insufficient. Further, when the content of Mn is over 1.0%, the above effects are saturated. Therefore, the content of Mn is 0.1% to 1.0%.

[Chromium (Cr): 0.5% or Less]

Cr is a useful element contributing to miniaturization of cementite gaps (lamellar gaps) in pearlite, and is effective for improving strength. In order to obtain these effects, a content of Cr is preferably 0.01% or more, more preferably 0.03% or more, and still more preferably 0.05% or more. On the other hand, when the content of Cr is over 0.5%, it takes a long time for pearlite transformation at the time of heat treatment (patenting treatment) to finish, which lowers productivity. Therefore, the content of Cr is 0.5% or less. Here, the patenting treatment is a heat treatment where a texture of a primary wire-drawing material is turned into austenite by keeping the primary wire-drawing material heated, and thereafter, it is quenched to a pearlite transformation temperature and is kept at the temperature so that it is isothermally transformed to pearlite.

[Phosphorus (P): 0.015% or Less]

P lowers wire drawability and ductility. Therefore, a content of P is 0.015% or less.

[Sulfur (S): 0.015% or Less]

S lowers wire drawability and ductility. Therefore, a content of S is 0.015% or less.

[Nitrogen (N): 0.01% or Less]

N lowers ductility. Therefore, a content of N is 0.01% or less.

Note that the steel wire 11 preferably contains one kind or two kinds or more selected from elements listed below as a selective element, in view of further improving a mechanical property and the like.

[Nickel (Ni): 1.0% or Less]

Ni acts to impart good wire drawability to pearlite generated through the transformation at the time of the heat treatment. However, even when a content of Ni is over 1.0%, the effect comparable to this content is not obtained. Therefore, in view of cost and so on, the content of Ni is preferably 1.0% or less. Further, when the content of Ni is less than 0.05%, the above effect is not obtained. Therefore, the content of Ni is preferably 0.05% or more.

[Copper (Cu): 0.5% or Less]

Cu is en element contributing to improvement in strength owing to its precipitation hardening. However, even when a content of Cu is over 0.5%, the effect comparable to this content is not obtained. Therefore, the content of Cu is preferably 0.5% or less. Further, when the content of Cu is less than 0.01%, the above effect is not sufficiently obtained. Therefore, the content of Cu is preferably 0.01% or more.

[Molybdenum (Mo): 0.5% or Less]

Mo has an effect of increasing tensile strength. However, when a content of Mo is over 0.5%, the pearlite transformation at the time of the heat treatment is delayed, resulting in a longer treatment time and lower productivity. Further, the effect comparable to this content is not obtained. Therefore, the content of Mo is preferably 0.5% or less. Further, when the content of Mo is less than 0.05%, the above effect is not sufficiently obtained. Therefore, the content of Mo is preferably 0.05% or more.

[Vanadium (V): 0.5% or Less]

V has an effect of increasing tensile strength. However, even when a content of V is over 0.5%, the effect comparable to this content is not obtained. Therefore, the content of V is preferably 0.5% or less. Further, when the content of V is less than 0.05%, the above effect is not sufficiently obtained. Therefore, the content of V is preferably 0.05% or more.

[Boron (B): 0.0050% or Less]

B has an effect of suppressing the generation of ferrite at the time of the heat treatment and is an element effective to improve strength. However, when a content of B is over 0.0050%, wire drawability lowers. Therefore, the content of B is preferably 0.0050% or less. Further, when the content of B is less than 0.0001%, the above effect is not sufficiently obtained. Therefore, the content of B is preferably 0.0001% or more.

The plating layer 11b of the steel wire 11 is a plating layer of, for example, copper (Cu), brass (Cu—Zn alloy), or Zn. The plating layer 11b improves wettability of the solder of the fixing part 12. A thickness of the plating layer 11b is desirably 1 μm or less. Further, the plating layer 11b penetrates in the steel strand 11a locally. The figure of the penetration portion 11c changes depending on the duration time of acid pickling of the steel wire 11 prior to the formation of the plating layer 11b and on wire-drawing conditions such as an approach angle of a dice used for wet wire drawing. As the duration time of the acid pickling is longer, a corrosion pit tends to be deeper and accordingly the penetration portion 11c tends to be deeper. Further, as the approach angle of the dice used for the wet wire drawing is larger, a surface of the steel wire 11 tends to curve more in a circumferential direction and accordingly the penetration portion 11c tends to be deeper.

When the penetration portion 11c is deep, folding (crack) is sometimes formed therein, which serves as a starting point of breakage to cause the easy exfoliation of the plating layer 11b, and bonding strength between the steel wire 11 and the fixing part 12 sometimes lowers. Further, the deep penetration portion 11c sometimes lowers fracture strength of the steel wire 11. In consideration of these, the depth of the penetration portion 11c is preferably 5 μm or less.

Further, the plating layer 11b of Cu, brass, or Zn itself exhibits lubrication performance during the wet wire drawing. However, when the depth of the penetration portion 11c is very small such as 0.5 μm or less, discontinuation in the circumferential direction sometimes occurs in parts of the plating layer 11b during the wet wire drawing. In such a case, in a portion where the plating layer 11b is not formed, it is sometimes difficult to obtain sufficient bonding strength between the steel wire 11 and the fixing part 12. Further, the discontinuation of the plating layer 11b sometimes indicates that the property of the steel wire 11 is deteriorated due to an increase in a heat generation amount during the wire drawing. In consideration of these, the depth of the penetration portion 11c is preferably 0.5 μm or more.

Therefore, the depth of the penetration portion 11c is desirably 0.5 μm to 5 μm, and more desirably about 1 μm to 2 μm.

The steel wire 11 whose tensile strength is 3500 MPa or more may be manufactured by, for example, the following method.

First, a steel billet having the aforesaid chemical components is fabricated, and a wire material is obtained through hot rolling of the steel billet. Next, intermediate wire drawing and intermediate heat treatment (patenting treatment) are applied to the wire material to adjust its wire diameter to a predetermined value. Thereafter, final heat treatment (patenting treatment) follows. Conditions of the final heat treatment are preferably set so that the austenitizing temperature is 950° C. to 1100° C. and the pearlite transformation temperature is 550° C. to 600° C. The final heat treatment is followed by acid pickling and plating of a final heat-treated material obtained through the final heat treatment. The kind of the plating is not particularly limited. For example, plating with Cu, brass, or Zn is performed. Another alternative may be plating with Cu—Sn, Ni, Ni—Sn, or the like. As a result of the acid pickling, a minute defect occurs in a surface of the wire material and a plating layer formed by the plating gets into the defect. The plating is followed by wire drawing by means of the wet wire drawing, so that the wire material is finished into the steel wire 11 with a predetermined diameter including the wire strand 11a and the plating layer 11b. As a result of the wire drawing, firm metallic bond exists between the steel strand 11a and the plating layer 11b.

Note that a thickness of the plating layer formed by the plating is desirably 1 μm or less. This is because in order to obtain the firm bond with the fixing part 12, an intermetallic compound layer having a small and uniform thickness is desirably formed on an interface between the fixing part and the plating layer 11b of the steel wire 11 in a manufacturing process of the saw wire, and the purpose is to effectively obtain this intermetallic compound layer. The intermetallic compound layer indicates the existence of chemical bond between the fixing part 12 and the plating layer 11b, but since intermetallic compounds generally have a brittle nature, the intermetallic compound layer easily suffers a crack if its thickness is too large. Therefore, the thickness of the intermetallic compound layer is desirably thin and uniform.

The diameter of the steel wire 11 has a direct influence on a cutting margin loss (kerf loss). Especially in recent years, a thickness of a wafer is very small such as several hundred μm, which has increased a ratio of a cutting margin. Therefore, a reduction in kerf loss is important also in view of cost reduction and productivity improvement. Therefore, the wire size (diameter) of the steel wire 11 is preferably 120 μm or less. Incidentally, as previously described, when the diameter is made small with the aim of reducing the kerf loss, the saw wire greatly bends and wafers suffer large warpage unless the cutting is performed under a condition where the saw wire is kept fully tensed. Further, wire breakage is likely to occur in accordance with the reduction in diameter. Therefore, when the diameter of the steel wire 11 is made small in order to reduce the kerf loss, tensile strength of the steel wire 11 is very important in order to suppress the wafer warpage and the wire breakage. In this embodiment, since tensile strength of the steel wire 11 is 3500 MPa or more, it is possible to suppress the wafer warpage and the wire breakage.

<Fixing Part 12>

Next, the fixing part 12 will be described.

As described above, the fixing part 12 includes the Sn-based solder containing Ag or the Sn-based solder containing Zn, for instance, and the solder includes the solder matrix 12a and the dispersion substance 12b dispersed in the solder matrix 12a. The Sn-based solder containing Ag and the Sn-based solder containing Zn each have a low melting point, and therefore, even the heating to such a degree that this solder melts does not soften the steel wire 11. That is, the melting point of the fixing part 12 is lower than a temperature at which the steel wire 11 softens. The fixing part 12 fixes the abrasive 13 to the steel wire 11. Therefore, strength of the solder used in the fixing part 12 is desirably high. Therefore, in this embodiment, in order to obtain high strength, the fixing part 12 having the dispersion substance 12b dispersed in the solder matrix 12a is used.

[Sn-Based Solder Containing Ag (Sn—Ag-Based Solder]

Here, the Sn—Ag-based solder will be described. The Sn—Ag-based solder is a common lead-free solder and contains various kinds of intermetallic compounds depending on the kind and amount of an additive. The various kinds of intermetallic compounds each may correspond to the dispersion substance 12b. These intermetallic compounds each have a higher melting point than a melting point of the solder matrix 12a. The intermetallic compound formed in the Sn—Ag-based solder is typically a Ni—Sn-based intermetallic compound, a Sn—Cu-based intermetallic compound, a Sn—Ag-based intermetallic compound, or a Sn—Ag-based intermetallic compound, and other intermetallic compounds are sometimes formed. Examples of the additive are As, Ba, Co, Cd, Fe, Ni, Pt, and the like. Further, examples of the shape of the intermetallic compound are an island shape, a granular shape, a plate shape, a needle shape, a strip shape, and a block shape.

Composition of the Sn—Ag-based solder is not particularly limited, and a content of Ag is desirably 0.5 mass % to 5.0 mass %. When the content of Ag is less than 0.5 mass %, the intermetallic compound containing Sn contributing to the improvement in strength is sometimes sufficiently formed. On the other hand, when the content of Ag is over 5.0 mass %, the strength may lower because the intermetallic compound containing Sn is coarse and the melting point is too high in some case.

As the dispersion substance 12b, the Sn—Ag-based intermetallic compound ($Ag_3Sn$) is especially desirable. Further, it is desirable that the Sn—Ag-based intermetallic compounds ($Ag_3Sn$) in a plate shape having an about 1 μm to 2 μm thickness or in a strip shape having an about 1 μm to 2 μm diameter are dispersed or form a network. That is, it is desirable that a texture in which the Sn—Ag-based intermetallic compounds are mutually coupled strengthens the Sn—Ag-based solder. When the Sn—Ag-based intermetallic compound is used as the dispersion substance 12b, the content of Ag in the Sn—Ag-based solder is also desirably 0.5 mass % to 5.0 mass %. When the content of Ag is less than 0.5 mass %, sufficient $Ag_3Sn$ for maintaining the strength is not sometimes formed. Further, when the content of Ag is over 5.0 mass %, deviation from eutectic composition (Sn:Ag=96.5: 3.5) is large, which sometimes lowers the strength because $Ag_3Sn$ is coarse and makes the melting point too high. Further, containing expensive Ag more than necessary is not desirable from an economic point of view. More desirably, the content of Ag is 1.0 mass % to 4.5 mass %, and when the Ag content is within this range, almost no coarse intermetallic compound in a block shape is formed, which enables to obtain still higher strength.

As previously described, depending on the kind and amount of an additive element except Sn and Ag, various kinds of intermetallic compounds are dispersed and formed as the dispersion substance 12b in the solder matrix 12a. Examples of the additive of the Sn-based solder containing 0.5 mass % to 5.0 mass % Ag are As, Ba, Co, Cd, Fe, Ni, Pt, and the like. Among all, it is desirable to contain 0.01 mass % to 0.5 mass % Fe and/or 0.01 mass % to 0.5 mass % Ni.

Fe and Ni slightly solid-dissolves in Sn and the solid-dissolved Fe and Ni improve strength of the solder matrix 12a. That is, solid-solution strengthening improves strength of the fixing part 12. When a content of Fe is less than 0.01 mass %, it is difficult to sufficiently obtain this effect. Further, when a content of Ni is less than 0.01 mass %, it is also difficult to sufficiently obtain this effect. On the other hand, when the content of Fe is over 0.5 mass %, $FeSn_2$ or the like being the intermetallic compound coheres to become coarse and serves as a starting point of breakage, which sometimes accelerates deterioration in strength. Further, when the content of Ni is over 0.5 mass %, $Ni_3Sn_4$ or the like being the intermetallic compound aggregates, gets coarse and serves as a starting point of breakage, which sometimes accelerates deterioration in strength.

The use of the Sn—Ag-based solder in the fixing part 12 leads to fining the texture at the time of cooling and solidification of the solder, that is, fining the intermetallic compound being the dispersion substance 12b and fining Sn crystal grains, which increases strength of the fixing part 12 to improve cutting performance of the saw wire. The wire size (diameter) of the steel wire 11 is desirably 120 μm or less as described above, and is more desirably 100 μm or less in view of fining the texture.

[Sn-Based Solder Containing Zn (Sn—Zn-Based Solder]

Next, the Sn—Zn-based solder will be described. As described above, strength of the solder used in the fixing part 12 is desirably high. When the Sn—Zn-based solder is used in the fixing part 12, it is desirable that the Sn—Zn-based solder is strengthened by a texture in which Zn in a plate shape having an about 1 μm to 2 μm thickness or in a needle shape having an about 1 μm to 2 μm diameter is dispersed in the solder matrix 12a. At this time, Zn may correspond to the dispersion substance 12b. Especially, the aforesaid Zn in the plate shape or in the needle shape has high mechanical strength, and the solder in which such Zn is dispersed as the dispersion substance 12b in the solder matrix 12a functions as a composite material. Therefore, the fixing part 12 including such a solder is excellent in strength and viscous toughness and has high ability to hold the abrasive 13. Therefore, the abrasive 13 does not easily exfoliate from the steel wire 11, and the saw wire in which the fixing part 12 using the Sn—Zn-based solder fixes the abrasive 13 to the steel wire 11 exhibits high cutting performance.

When the Sn—Zn-based solder is melted and solidified, Zn in the Sn—Zn-based solder precipitates with almost no solid-solution in the matrix. At this time, in order to surely precipitate Zn in the plate shape having an about 1 μm to 2 μm thickness or in the needle shape with an about 1 μm to 2 μm diameter, a content of Zn is desirably 1 mass % or more. Further, the higher is the content of Zn, the more is an amount of the plate-shaped or needle-shaped Zn and the more does the strength improve. However, when the content of Zn is over 35 mass %, a temperature at which the solder starts to solidify is about 320° C. and Zn is more easily oxidized. Therefore, the content of Zn is desirably 35 mass % or less. Incidentally, a temperature of a eutectic point of an Sn—Zn alloy is 198.5° C., and composition of the eutectic point is "Sn: 91.2 mass %, Zn: 8.8 mass %". Further, from a viewpoint of improving strength by the miniaturization of Zn and from a viewpoint of suppressing deterioration in strength of the steel wire 11, a melting point of the Sn—Zn-based solder is desirably low. Therefore, composition of the Sn—Zn-based solder is more desirably within about ±4 mass % of that of the eutectic point, though slightly differing depending on the kind and amount of the other additive element. That is, the composition of the Sn—Zn-based solder is more desirably within a range from "Sn: 96 mass %, Zn: 4 mass %" to "Sn: 88 mass %, Zn: 12 mass %".

Since Zn is easily oxidized, an oxide film is likely to be formed on a surface of the Sn—Zn-based solder, and the Sn—Zn-based solder is inferior in wettability to other solders such as a Sn—Pb-based solder, a Sn—Ag-based solder, and a Sn—Bi-based solder. Therefore, the Sn—Zn-based solder preferably contains an additive element improving wettability. Examples of the additive element to the Sn—Zn-based solder, that is, "X" when composition of the solder is expressed by "Sn—Zn—X" are Bi, Ba, B, Cd, Ni, Cu, Fe, Sb, Pb, In, Ag, Mo, Co, and the like. Among all, elements effective to improve wettability are Bi, Ni, Cu, Fe, Sb, Pb, In, and Ag, and among them, Bi is the most effective. In this embodiment, the Sn—Zn-based solder preferably contains at least one kind selected from a group consisting of Bi, Ni, Cu, Fe, Sb, Pb, In, and Ag totally in an amount of 0.5 mass % to 5 mass %. When a content of the additive element (X) is less than 0.5 mass %, the effect is insufficient. When the content of the additive element (X) is over 5 mass %, a coarse intermetallic compound of the additive element and Sn or Zn is sometimes formed.

The use of the an Sn—Zn-based solder in the fixing part 12 leads to fining the texture at the time of cooling and solidification of the solder, that is, leads to fining the needle-shaped Zn being the dispersion substance 12b and fining Sn crystal grains, which increases strength of the fixing part 12 to improve cutting performance of the saw wire. The wire size (diameter) of the steel wire 11 is desirably 120 μm or less and is more desirably 100 μm or less in view of fining the texture as described above.

<Abrasive 13>

Next, the abrasive 13 will be described.

Examples of a material of the abrasive 13 are alumina ($Al_2O_3$), SiC, $SiO_2$, diamond, and the like. Among them, diamond is the most excellent in hardness and heat conductivity. In this embodiment, the abrasive 13 is covered with the covering layer 14. The covering layer 14 is provided to improve the bonding strength between the fixing part 12 and the abrasive 13. The covering layer 14 preferably contains a layer of Ni or Cu in view of improving wettability of the solder of the fixing part 12, for instance. The layer of Ni or Cu may be formed through the plating or the like of the abrasive 13. When the abrasive 13 is a diamond abrasive, chemical bond between atoms of Ni or Cu and diamond does not occur, and the layer of Ni or Cu only physically or mechanically wraps the diamond abrasive. Therefore, in this case, the covering layer 14 desirably includes a base layer of Ti (titanium) or Cr (chromium) as a metal layer capable of chemically bonding with the diamond abrasive. That is, the covering layer 14 desirably includes the base layer chemically bonded with the diamond abrasive and the layer of Ni or Cu metallic-bonded with the base layer. Incidentally, Ti and Cr are poor in solder wettability, and therefore, it is important that the layer of Ni or Cu is formed on an outer side of the metal layer. The bond between Ti or Cr and Ni or Cu is metallic bond, and therefore, such a covering layer 14 is strongly bonded with the diamond abrasive, leading to good solder wettability.

As an average diameter of the abrasive 13 is larger, clogging is less likely to occur at the time of cutting using the saw wire, and therefore, it is possible to improve a cutting speed, but on the other hand, the kerf loss becomes large. In consideration of such improvement in cutting speed and reduction in kerf loss, the average size (diameter) of the abrasive 13 is desirably about 1/12 to 2/5 of the diameter of the steel wire 11, and more desirably about 1/6 to 2/5.

Incidentally, a material of the diamond abrasive is desirably a crushed diamond rather than what is called a single crystalline diamond whose crystal habit surface has good symmetry, in view of increasing its joint area with the steel wire 11.

A thickness of the covering layer 14 is desirably 1 μm to 5 μm. When the thickness of the covering layer 14 is less than 1 μm, the intermetallic compound layer 15 is not sufficiently formed and the abrasive 13 is not sometimes fully fixed to the steel wire 11, which will be described in detail later. On the other hand, when the thickness of the covering layer 14 is over 5 μm, a cutting edge of the abrasive 13 such as the diamond abrasive thickly is covered with the covering layer 14, so that the cutting edge of the abrasive 13 has a difficulty in reaching a workpiece (object to be cut), which sometimes lowers cutting performance.

The abrasive 13 is suitable for the steel wire 11 whose diameter is small. The reason is that the steel wire 11 having a smaller diameter has a larger curvature in the circumferential direction, and therefore, with the equal diameter and density of the abrasive 13, as the diameter is smaller, cutting chips easily come out and thus clogging is more unlikely to occur, resulting in improved cutting performance. That is, the abrasive 13 is more preferably used for the steel wire 11 with a wire size (diameter) of 120 μm or less, more preferably 100 μm or less, rather than used for the thick steel wire 11 whose wire size (diameter) is about 180 μm.

[Intermetallic Compound Layer 15]

Next, the intermetallic compound layer 15 will be described.

In this embodiment, the covering layer 14 is covered with the intermetallic compound layer 15 as described above. That is, the intermetallic compound layer 15 exists between the covering layer 14 and the fixing part 12. The intermetallic compound layer 15 is formed through the chemical bond between an uppermost surface layer of the covering layer 14 and the solder of the fixing part 12. That is, the intermetallic compound layer 15 is formed through the chemical bond between, for example, Ni or Cu and the Sn-based solder containing Ag or Zn. From this, it can be said that firm bond exists between the fixing part 12 and the abrasive 13. Further, the melting point of the intermetallic compound layer 15 is higher than the melting point of the fixing part 12. Incidentally, an intermetallic compound forming the intermetallic compound layer 15 is an alloy composed of a plurality of metal elements, and the concept of this intermetallic compound also includes an alloy in which a composition ratio of these elements is not an integer ratio.

As described above, intermetallic compounds generally have a brittle nature, and therefore, the intermetallic compound layer 15 easily suffers a crack if its thickness is too large, which sometimes lowers strength for fixing the abrasive 13. Therefore, the thickness of the intermetallic compound layer 15 is desirably more uniform and smaller. Therefore, how to combine a material of the solder of the fixing part 12 and a material of the surface layer of the covering layer 14 is an important issue.

In this respect, when a Sn—Zn-based solder is used as the material of the solder of the fixing part 12 and Ni is used as the material of the surface layer of the covering layer 14, the intermetallic compound layer 15 whose thickness is relatively small and uniform is easily formed. Therefore, this combination is very preferable.

Further, when a Sn—Ag-based solder is used as the material of the solder of the fixing part 12 and Ni is used as the material of the surface layer of the covering layer 14, the intermetallic compound layer 15 whose thickness is relatively small and uniform is also easily formed. Therefore, this combination is also preferable.

On the other hand, when a Sn—Ag-based solder (for example, a solder whose Ag content is 0.5 mass % to 5.0 mass %) is used as the material of the solder of the fixing part 12 and Cu is used as the material of the surface layer of the covering layer 14, a layer of $Cu_6Sn_5$ or $Cu_3Sn$ whose thickness is relatively large such as 3 μm to 5 μm and is not uniform is formed as the intermetallic compound layer 15, which is likely to cause a crack. Therefore, when a Sn—Ag-based solder is used as the material of the solder of the fixing part 12, it is important to use Ni as the material of the surface layer of the covering layer 14.

Further, when a Sn—Ag-based solder is used as the material of the solder of the fixing part 12, especially when a Sn—Ag-based solder whose Ag content is 0.5 mass % to 5.0 mass % is used, it is desirable that a thin layer of $Ni_3Sn_4$ or $Ni_3Sn_2$ with a 2 μm thickness or less exists as the intermetallic compound layer 15. For example, when such an Sn—Ag-based solder contains 1.5 mass % Cu or more, the intermetallic compound layer 15 expressed by $Sn_{(1-x-y)}Ni_xCu_y$, $(0.1 \leq x \leq 0.7, 0.0 < y \leq 0.8)$ is formed. Further, for example, when about 0.5 mass % Cu is contained, the intermetallic compound layer 15 expressed by $Sn_{(1-x-y)}Ni_xCu_y$ $(0.1 \leq x \leq 0.7, 0.0 < y \leq 0.5)$ in which Cu is solid-dissolved is formed. In the latter, when a value of "y" representing a ratio of Cu is over 0.5, the intermetallic compound layer 15 sometimes is too thick, which is not desirable. As the intermetallic compound layer 15, a layer of $Ni_3Sn_4$, $Ni_3Sn_2$, or $Sn_{(1-x-y)}Ni_xCu_y$ $(0.1 \leq x \leq 0.7, 0.0 < y \leq 0.5)$ is more desirable, and its thickness is desirably 1 μm or less.

Examples of the intermetallic compound layer 15 containing Cu, other than the above-mentioned ones, are a Cu—Sn—Zn-based intermetallic compound layer, a Cu—Zn-based intermetallic compound layer, and the like.

When a Sn—Zn-based solder is used as the solder of the fixing part 12, various kinds of the intermetallic compound layers 15 such as a Sn—Ba based one, a Sn—Ni—Zn-based one, a Sn—Ni-based one, a Ni—Zn-based one, and an Sn—Mo-based one are formed depending on an additive element to the Sn—Zn-based solder and firm bond is obtained. Among them, it is especially desirable that an intermetallic compound layer of at least one kind or more selected from the Sn—Ni—Zn-based one, the Sn—Ni based one, and the Ni—Zn-based one with a 2 μm thin thickness is formed as the intermetallic compound layer 15. Further, the intermetallic compound layer 15 is more desirably a Sn—Ni—Zn-based intermetallic compound layer with a 1 μm thickness or less.

Owing to the existence of such an intermetallic compound layer 15, firm bond is obtained on the interface between the solder of the fixing part 12 and the covering layer 14. It should be noted that the composition of these intermetallic compounds does not necessarily have to be stoichiometric composition.

[Manufacturing Method of Saw Wire]

Next, the outline of a manufacturing method of the saw wire will be described.

First, in a manner as described above, the steel wire 11 is fabricated. In view of wettability of the solder of the fixing part 12, as the steel wire 11, one including the steel strand 11a and the plating layer 11b is desirably used, but one not including the plating layer 11b may be used. That is, the steel strand 11a may be used as the steel wire 11 as it is. Further, the steel wire 11 covered with a solder may be used. In this case, it is also possible to obtain good wettability of the solder of the fixing part 12.

Next, the abrasive 13 on which the covering layer 14 is formed is prepared, and a Sn—Ag-based solder or a Sn—Zn-based solder and a flux are mixed in the abrasive 13 to fabricate a paste mixture. As the Sn—Ag-based solder or the Sn—Zn-based solder, a minute solder in a minute ball shape is desirably used. This is intended to enhance uniformity of the mixture. A diameter of the minute solder in the ball shape is desirably ⅕ to ⅓ of the diameter of the steel wire 11. This is intended to ensure uniformity at the time of the drawing from a nozzle which will be described next.

Then, the steel wire 11, for example, the steel wire 11 covered with the solder in advance, is made to pass in a container containing the aforesaid paste mixture, and thereafter, is drawn out from a tip of the nozzle having a hole with a predetermined diameter. As a result, the paste mixture with a predetermined thickness is applied on the surface of the steel wire 11. Subsequently, the steel wire 11 coated with the paste mixture is made to pass in a heated electric furnace, whereby the solder is melted. Next, by cooling outside the electric furnace, the solder is solidified, so that the abrasive 13 is fixed to the steel wire 11. Thereafter, the steel wire 11 is made to pass in a cleaning tank, where a surplus flux component is removed. In this manner, the saw wire may be manufactured. The manufactured saw wire is taken up by a reel, for instance. Incidentally, at the time of the heat treatment in the electric furnace, Fe in the steel wire 11 slightly seeps into the solder to improve strength of the solder. From this viewpoint as well, it can be said that the saw wire in which the Sn—Ag-based solder containing 0.5 mass % to 5.0 mass % Ag is used in the fixing part 12 and the abrasive 13 covered by the covering layer 14 containing Ni is fixed to the steel wire 11 has desirable combination.

As described above, in the saw wire 10 according to this embodiment, the fixing part 12 including the solder matrix 12a comprised of the Sn-based solder containing Ag or the Sn-based solder containing Zn and the dispersion substance 12b fixes the abrasive 13 to the steel wire 11, which makes it possible to improve holding force of the abrasive 13 with ease and at low cost and to obtain excellent cutting performance. Since this saw wire 10 is suitable for high-precision machining of, especially semiconductors and the like, its industrial effect is enormous.

Especially when the Sn—Ag-based solder containing 0.5 mass % to 5.0 mass % Ag is contained in the fixing part 12, the dispersion substance 12b is the intermetallic compound containing Sn, and the covering layer 14 contains Ni, a remarkable effect is obtained. Further, when the Sn—Zn-based solder is contained in the fixing part 12 and the dispersion substance 12b is the intermetallic compound containing Sn or Zn, a remarkable effect is also obtained.

The dispersion substance 12b desirably exists at one place or more out of a periphery of the abrasive 13, a surface of the saw wire 10, and the surface of the high-tension steel wire 11. Further, the melting point of the dispersion substance 12b is desirably 700° C. or higher. This is because strength for fixing the abrasive 13 during the cutting can be further increased in the both cases.

EXAMPLES

Next, experiments conducted by the present inventors will be described. Conditions and so on in these experiments are only examples adopted for confirming feasibility and effects of the present invention, and the present invention is not limited to these examples.

The following Table 1 presents the composition, wire size (diameter), tensile strength, and the depth of the penetration portion of the plating layer in steel strands used in the following various examples. As described above, the depth of the penetration portion of the plating layer is preferably not less than 0.5 μm nor more than 5 μm, and in this range, is especially desirably not more than 1 μm nor more than 2 μm.

TABLE 1

| wire strand No. | chemical component (mass %) | | | | | | | | | | | | diameter (μm) | tensile strength (MPa) | depth of getting portion of plating layer (μm) |
|---|---|---|---|---|---|---|---|---|---|---|---|---|---|---|---|
| | C | Si | Mn | Cr | P | S | N | Ni | Cu | Mo | V | B | | | |
| S1 | 0.84 | 0.96 | 0.78 | — | 0.006 | 0.005 | 0.0027 | — | — | — | — | — | 100 | 3817 | 1.5 |
| S2 | 1.03 | 0.24 | 0.36 | 0.19 | 0.009 | 0.004 | 0.0032 | — | — | — | — | — | 100 | 4329 | 1.8 |
| S3 | 1.12 | 0.17 | 0.31 | 0.22 | 0.008 | 0.008 | 0.0032 | — | — | — | — | — | 100 | 4528 | 0.9 |
| S4 | 0.85 | 0.32 | 0.51 | 0.23 | 0.006 | 0.006 | 0.004 | — | — | — | — | — | 120 | 3835 | 1.4 |
| S5 | 0.94 | 0.22 | 0.33 | 0.12 | 0.007 | 0.007 | 0.0031 | — | — | — | — | — | 120 | 4020 | 1.8 |
| S6 | 1 | 0.18 | 0.47 | 0.13 | 0.008 | 0.006 | 0.0029 | — | — | 0.04 | — | 0.0011 | 120 | 4314 | 1.5 |
| S7 | 1.17 | 0.3 | 0.32 | 0.31 | 0.005 | 0.005 | 0.0023 | — | — | — | — | 0.0017 | 120 | 4509 | 1.9 |
| S8 | 1.05 | 0.64 | 0.55 | — | 0.008 | 0.007 | 0.0031 | — | — | — | — | — | 120 | 4073 | 0.9 |
| S9 | 0.94 | 0.56 | 0.41 | — | 0.004 | 0.007 | 0.0024 | 0.24 | 0.11 | — | — | — | 100 | 4315 | 1.2 |
| S10 | 0.83 | 0.24 | 0.52 | 0.07 | 0.008 | 0.009 | 0.0038 | — | — | — | 0.13 | — | 100 | 3826 | 2.1 |
| S11 | 0.71 | 0.22 | 0.53 | — | 0.011 | 0.006 | 0.004 | — | — | — | — | — | 160 | 3012 | 0.2 |
| S12 | 0.73 | 0.31 | 0.66 | — | 0.009 | 0.01 | 0.0044 | — | — | — | — | — | 160 | 3117 | 2.5 |
| S13 | 0.73 | 0.19 | 0.43 | — | 0.009 | 0.008 | 0.0033 | — | — | — | — | — | 160 | 3236 | 7.5 |
| S14 | 0.75 | 0.34 | 0.79 | — | 0.006 | 0.008 | 0.0041 | — | — | — | 0.09 | — | 160 | 3350 | 1.5 |
| S15 | 0.78 | 0.54 | 0.87 | — | 0.006 | 0.007 | 0.0039 | — | — | — | — | — | 160 | 3409 | 0.3 |
| S16 | 0.77 | 0.16 | 0.51 | 0.11 | 0.006 | 0.009 | 0.0038 | — | — | — | — | — | 150 | 3443 | 2.5 |
| S17 | 0.85 | 0.32 | 0.51 | 0.23 | 0.006 | 0.006 | 0.004 | — | — | — | — | — | 120 | 3805 | 0.4 |
| S18 | 0.94 | 0.22 | 0.33 | 0.12 | 0.007 | 0.007 | 0.0031 | — | — | — | — | — | 120 | 4000 | 5.5 | n.b.) "—" in the column of the chemical component means that the component is not added on purpose.

Example 1

In an example 1, a steel wire in which a surface of a wire strand was covered with brass with an about 50 nm thickness was used. As the steel strand, steel strand No. S7 was used. As presented in Table 1, tensile strength of the steel strand No. S7 was 4509 MPa. Composition of brass was "Cu:Zn=2:1" in terms of mol ratio. A diameter of the steel wire was made 120 µm. As an abrasive, used was a diamond abrasive covered with a covering layer where a Ti plating layer was located on an inner side and a Ni plating layer was located on an outer side. A thickness of the Ti plating layer was 50 nm and a thickness of the Ni plating layer was 3 µm. An average diameter of the diamond abrasive was 25 µm. As a solder of a fixing part, a Sn—Ag-based solder containing 0.05 mass % Fe and 0.05 mass % Ni was used. In the Sn—Ag-based solder, a Sn content was 96.5 mass % and a Ag content was 3.4 mass %. As the Sn—Ag-based solder, a solder ball with a 30 µm average diameter was used.

In the manufacture of a saw wire, the aforesaid diamond abrasive and Sn—Ag-based solder and a flux containing zinc halide were mixed and stirred, whereby a paste mixture was fabricated. Here, a ratio of the Sn—Ag-based solder, the abrasive, and the flux was "Sn—Ag-based solder:abrasive:flux=3:2:4" in terms of mass ratio.

Further, the steel wire was subjected to acetone washing and thereafter was coated with a solder with an about 3 µm thickness. In this solder coating, the steel wire was made to pass at a speed of 50 cm/second in a Sn—Ag-based solder containing Sn: 96.5 mass %, Ag: 3.4 mass %, Fe: 0.05 mass %, and Ni: 0.05 mass % and melted at 250° C., and a surplus portion of the Sn—Ag-based solder was wiped off.

Then, after the solder coating, the steel wire was made to pass in a container containing the aforesaid paste mixture, and thereafter, was drawn out from a tip of a nozzle having a hole with an about 200 µm diameter. In this manner, a surface of the steel wire was coated with the paste mixture with a predetermined thickness. Subsequently, the steel wire coated with the paste mixture was made to pass at a 0.1 m/minute speed in a tubular electric furnace which was heated to 270° C. and whose soaking zone had an about 40 cm length, whereby the solder was melted. Next, by cooling outside the tubular electric furnace, the solder was solidified, so that the abrasive was fixed to the steel wire. Thereafter, the steel wire was made to pass in a cleaning tank, where a surplus flux component was removed. In this manner, the saw wire was produced. The produced saw wire was taken up by a reel.

Figure 2A:
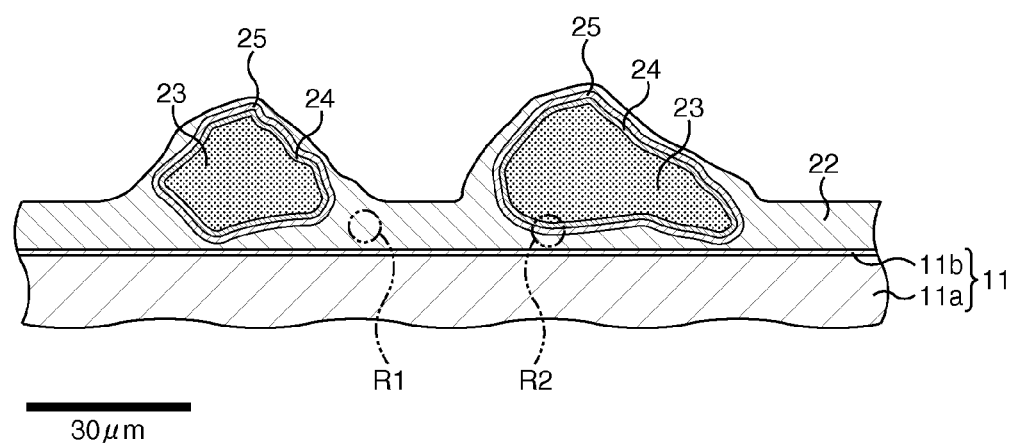
FIG. 2A is a cross-sectional view illustrating a saw wire obtained in an example 1.
Figure 2B:
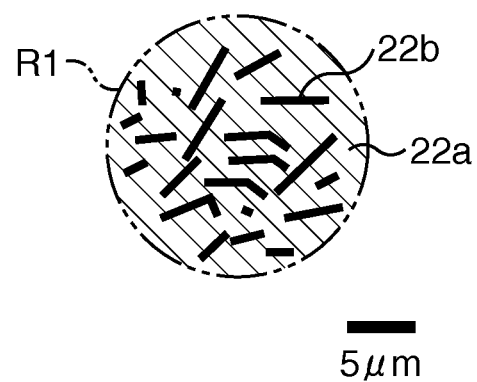
FIG. 2B is an enlarged view of a region R1 in FIG. 2A.
Figure 2C:
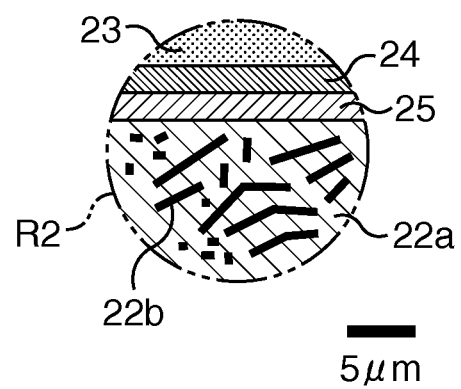
FIG. 2C is an enlarged view of a region R2 in FIG. 2A.

A texture around the abrasive of the obtained saw wire was observed. Schematic views of this texture are illustrated in FIG. 2A to FIG. 2C. FIG. 2B is an enlarged view of a region R1 in FIG. 2A, and FIG. 2C is an enlarged view of a region R2 in FIG. 2A. It was seen from element analysis that a Ni plating layer 24 with a 1 µm to 2 µm thickness existed around the diamond abrasive 23, and a Sn—Ni-based intermetallic compound layer 25 with a 1 µm to 2 µm thickness distributed around the Ni plating layer 24. Sn—Ni-based intermetallic compounds also scattered in a solder matrix 22a of a fixing part 22. Further, in the solder matrix 22a, there was confirmed a texture in which Sn—Ag-based intermetallic compounds 22b in a plate shape having an about 1 µm to 2 µm thickness or in a strip shape having an about 1 µm to 2 µm diameter were dispersed or linked in a network form. Further, from analysis of composition of the Sn—Ni-based intermetallic compound, it was seen that this intermetallic compound contained a small amount of Cu and the composition of this intermetallic component was "Sn:Ni:Cu=55:42:3" in terms of mol ratio. Further, from analysis of composition of the Sn—Ag-based intermetallic compound, it was seen that the composition of this intermetallic compound was "Sn:Ag=25:75" in terms of mol ratio. An intermetallic compound containing Fe did not exist in the solder, and a concentration of Fe was high on a surface of the saw wire and decreased in accordance with an increase in distance from the surface. Further, thickening of Fe was also observed on a surface of the Ni plating layer covering the abrasive. From this, it is thought that Fe solid-dissolved in the solder and exhibited an action to increase strength of the solder.

Further, cutting performance of such a saw wire was evaluated. In this evaluation, a length of the saw wire was 30 m, tension applied to the saw wire was set to 20 N, a moving speed of the saw wire was set to 400 m/minutes, and a working load (weight of a weight for pressing a workpiece against the saw wire) was set to 100 gf, and a silicon single crystal with a 20 mm diameter was cut while the saw wire was reciprocated. Further, water was used as a cooling solvent. A cutting speed at this time was 9.9 mm/minute, which was a speed high enough. Further, during the cutting of the silicon single crystal, almost no exfoliation of the abrasive from the saw wire was confirmed.

From these results, it is apparent that under the conditions in the example 1, a solder-fixing-type saw wire excellent in cutting performance can be obtained.

Example 2

In an example 2, a steel wire in which a surface of a steel strand was covered with Cu with an about 50 nm thickness was used. As the steel strand, steel strand No. S4 was used. As presented in Table 1, tensile strength of the steel strand No. S4 was 3835 MPa. A diameter of the steel wire was made 120 µm. As an abrasive, used was a diamond abrasive covered with a covering layer in which a Cr plating layer was located on an inner side and a Ni plating layer was located on an outer side. A thickness of the Cr plating layer was 50 nm and a thickness of the Ni plating layer was 3 µm. An average diameter of the diamond abrasive was 25 µm. As a solder of a fixing part, a Sn—Ag—Cu-based solder containing 0.05 mass % Ni was used. Roughly, in the Sn—Ag—Cu-based solder, a Sn content was 96.5 mass %, a Ag content was 3.0 mass %, and a Cu content was 0.5 mass %. As the Sn—Ag—Cu-based solder, a solder ball with a 30 µm average diameter was used.

In the manufacture of a saw wire, the aforesaid diamond abrasive and Sn—Ag—Cu-based solder and a flux containing zinc halide were mixed and stirred, whereby a paste mixture was fabricated. Here, a ratio of the Sn—Ag—Cu-based solder, the abrasive, and the flux was "Sn—Ag—Cu-based solder:abrasive:flux=3:2:3" in terms of mass ratio.

Further, the steel wire was subjected to acetone washing and thereafter was coated with a solder with an about 3 µm thickness. In this solder coating, the steel wire was made to pass at a speed of 50 cm/second in a Sn—Ag—Cu-based solder containing Sn: 96.5 mass %, Ag: 3.0 mass %, Cu: 0.5 mass %, and Ni: 0.05 mass % and melted at 250° C., and a surplus portion of the Sn—Ag—Cu-based solder was wiped off.

Then, after the solder coating, the steel wire was made to pass in a container containing the aforesaid paste mixture, and thereafter, was drawn out from a tip of a nozzle having a hole with an about 200 µm diameter. In this manner, a surface of the steel wire was coated with the paste mixture with a predetermined thickness. Subsequently, the steel wire coated with the paste mixture was made to pass at a speed of 0.1 m/minute in a tubular electric furnace which was heated to 270° C. and whose soaking zone had an about 40 cm length, whereby the solder was melted. Next, the solder was solidified by cooling outside the tubular electric furnace, so that the abrasive was fixed to the steel wire. Thereafter, the steel wire was made to pass in a cleaning tank, where a surplus flux component was removed. In this manner, the saw wire was produced. The produced saw wire was taken up by a reel.

A texture around the abrasive of the obtained saw wire was observed. From element analysis, it was seen that a Ni plating layer with a 1 μm to 2 μm thickness existed around the diamond abrasive, and Sn—Ni—Cu-based intermetallic compounds distributed in a 2 μm to 3 μm thickness around the Ni plating layer. Sn—Ni—Cu-based intermetallic compounds also scattered in a solder matrix of a fixing part. Further, in the solder matrix, there was observed a texture in which Sn—Ag-based intermetallic compounds in a plate shape having an about 1 μm to 2 μm thickness or in a strip shape having an about 1 μm to 2 μm diameter and Sn—Cu-based intermetallic compounds in a granular shape with an about 1 μm to 2 μm diameter were dispersed. Further, from analysis of composition of the Sn—Ni—Cu-based intermetallic compound, it was seen that the composition of this intermetallic component was "Sn:Ni:Cu=40:26:34" in terms of mol ratio. Further, from analysis of composition of the Sn—Ag-based intermetallic compound, it was seen that the composition of this intermetallic compound was "Sn:Ag=25: 75" in terms of mol ratio.

Further, cutting performance of such a saw wire was evaluated under the same conditions as those of the example 1. At this time, a cutting speed was 9.1 mm/minute, which was high enough. Further, during the cutting of a silicon single crystal, almost no exfoliation of the abrasive from the saw wire was confirmed.

From these results, it is apparent that under the conditions in the example 2, a solder-fixing-type saw wire excellent in cutting performance can also be obtained.

Example 3

In an example 3, a steel wire in which a surface of a steel strand was covered with brass with an about 50 nm thickness was used. As the steel strand, steel strand No. S1 was used. As presented in Table 1, tensile strength of the steel strand No. S1 was 3817 MPa. Composition of brass was "Cu:Zn=2:1" in terms of mol ratio. A diameter of the steel wire was made 100 μm. As an abrasive, used was a diamond abrasive covered with a covering layer in which a Ti plating layer was located on an inner side and a Ni plating layer was located on an outer side. A thickness of the Ti plating layer was 50 nm and a thickness of the Ni plating layer was 4 μm. An average diameter of the diamond abrasive was 30 μm. As a solder of a fixing part, a Sn—Ag—Cu-based solder containing 0.05 mass % Fe was used. Roughly, in the Sn—Ag—Cu-based solder, a Sn content was 94.0 mass %, a Ag content was 5.0 mass %, and a Cu content was 1.0 mass %. As the Sn—Ag—Cu-based solder, a solder ball with a 30 μm average diameter was used.

In the manufacture of a saw wire, the aforesaid diamond abrasive and Sn—Ag—Cu-based solder and a flux containing zinc halide were mixed and stirred, whereby a paste mixture was fabricated. Here, a ratio of the Sn—Ag—Cu-based solder, the abrasive, and the flux was "Sn—Ag—Cu-based solder:abrasive:flux=2:2:3" in terms of mass ratio.

Further, the steel wire was subjected to acetone washing and thereafter was coated with a solder with an about 3 μm thickness. In this solder coating, the steel wire was made to pass at a speed of 50 cm/second in a Sn—Ag—Cu-based solder containing Sn: 94.0 mass %, Ag: 5.0 mass %, and Cu: 1.0 mass % and melted at 250° C. and a surplus portion of the Sn—Ag—Cu-based solder was wiped off.

Then, after the solder coating, the steel wire was made to pass in a container containing the aforesaid paste mixture, and thereafter, was drawn out from a tip of a nozzle having a hole with an about 250 μm diameter. In this manner, a surface of the steel wire was coated with the paste mixture with a predetermined thickness. Subsequently, the steel wire coated with the paste mixture was made to pass at a speed of 0.15 m/minute in a tubular electric furnace which was heated to 280° C. and whose soaking zone had an about 40 cm length, whereby the solder was melted. Next, the solder was solidified by cooling outside the tubular electric furnace, so that the abrasive was fixed to the steel wire. Thereafter, the steel wire was made to pass in a cleaning tank, where a surplus flux component was removed. In this manner, the saw wire was produced. The produced saw wire was taken up by a reel.

A texture around the abrasive of the obtained saw wire was observed. From element analysis, it was seen that a Ni plating layer with a 1 μm to 2 μm thickness existed around the diamond abrasive, and around the Ni plating layer, Sn—Ni—Cu-based intermetallic compounds distributed in a 2 μm to 3 μm thickness. Sn—Ni—Cu-based intermetallic compounds also scattered in the solder matrix of the fixing part. Further, in the solder matrix, there was confirmed a texture in which Sn—Ag-based intermetallic compounds in a plate shape having an about 1 μm to 2 μm thickness or in a strip shape having an about 1 μm to 2 μm diameter and Sn—Cu-based intermetallic compounds in a granular shape with an about 1 μm to 2 μm diameter were dispersed. Further, from analysis of composition of the Sn—Ni—Cu-based intermetallic compound, it was seen that the composition of this intermetallic component was "Sn:Ni:Cu=43:25:32" in terms of mol ratio. Further, from analysis of composition of the Sn—Ag-based intermetallic compound, it was seen that the composition of this intermetallic compound was "Sn:Ag=25:75" in terms of mol ratio. Further, from analysis of composition of the Sn—Cu-based intermetallic compound, it was seen that the composition of this intermetallic compound was "Sn:Cu=45:55" in terms of mol ratio.

Further, cutting performance of such a saw wire was evaluated under the same conditions as those of the example 1. At this time, a cutting speed was 8.4 mm/minute, which was high enough. Further, during the cutting of a silicon single crystal, almost no exfoliation of the abrasive from the saw wire was confirmed.

From these results, it is apparent that under the conditions in the example 3, a solder-fixing-type saw wire excellent in cutting performance can also be obtained.

Example 4

Saw wires were fabricated under various conditions presented in the following Table 2, Table 3, and Table 4 in accordance with the example 1 to the example 3, and their cutting performances were compared. Table 2 presents structures of their steel wires and abrasives. Table 3 presents structures of their ball-shaped (spherical) solders each used in a fixing part and of paste mixtures each containing this solder. Table 4 presents conditions of heat treatment for melting the solders with a tubular electric furnace, conditions when a silicon single crystal was cut, and evaluation results of exfoliation states of the abrasives. In Table 4, "GC" represents green silicon carbide. In the evaluation of the exfoliation state of the abrasive, after a test of cutting performance, that is, after the silicon single crystal was cut, surfaces of the saw wires were observed, and a residual state of each of the abrasives was assessed according to the following criteria. Then, those rated as "A" or higher were determined as being durable in practical use.

⊚: Almost no exfoliation was observed.
○: Slight exfoliation was observed.
Δ: An exfoliated place was apparently observed.
X: Exfoliation progressed on the whole surface.

Further, a texture around the abrasive of each of the obtained saw wires was observed, and it was found that in tests No. 4-1 to No. 4-18, a Ni-plating metal layer with a 1 μm to 2 μm thickness exited around the abrasive, and around the Ni-plating metal layer, Sn—Ni-based intermetallic compounds distributed in a 1 μm to 2 μm thickness. Further, in test No. 4-10, the dispersion of $SnBaO_3$ was observed. In test No. 4-11, an Sn—B-based intermetallic compound was observed. In test No. 4-12, $NiMoO_4$ was observed around the abrasive.

Note that tests No. 1, No. 2, and No. 3 in Table 2 to Table 4 are the above-described example 1, example 2, and example 3 respectively.

From these results, it is apparent that under the conditions of tests No. 4-1 to No. 4-22, fixed-abrasive saw wires of a solder-fixing type excellent in cutting performance could be obtained as in the example 1 to the example 3.

On the other hand, in tests No. 4-23 to No. 4-26, No. 4-29, No. 4-31, and No. 4-32 being comparative examples, cutting speed was low due to low tensile strength of the steel strands. Note that "Inconel" in test No. 4-29 is a trademark registered by Special Metals Incorporated. It is thought that a reason why cutting performance was low in tests No. 4-23 to No. 4-26, No. 4-29, and No. 4-30 being comparative examples is that, because plating metal on an outer side of a covering layer covering the abrasive was Cu, an intermetallic compound containing Cu was formed in a large thickness on an interface between the solder and Cu of the covering layer and a crack was easily caused near this intermetallic compound. It is thought that a reason why cutting speed and cutting performance became low in tests No. 4-27, No. 4-28, and No. 4-30 being comparative examples is that, due to the absence of Ag in the solder, appropriate high-melting-point metal was not formed as the dispersion substance, and strength of the fixing part was low and the abrasive exfoliated, even though tensile strength of the steel wires was high.

TABLE 2

| test No. | steel wire — steel strand No. | diameter (μm) | tensile strength (MPa) | plating layer | thickness of solder (μm) | abrasive — material | diameter (μm) | covering layer — inner | covering layer — outer | note |
|---|---|---|---|---|---|---|---|---|---|---|
| 1 | S7 | 120 | 4509 | brass: 50 nm | 3 | diamond | 35 | Ti: 50 nm | Ni: 3 μm | example of |
| 2 | S4 | 120 | 3835 | copper: 50 nm | 3 | diamond | 35 | Cr: 50 nm | Ni: 3 μm | present |
| 3 | S1 | 100 | 3817 | brass: 50 nm | 3 | diamond | 40 | Ti: 50 nm | Ni: 4 μm | invention |
| 4-1 | S4 | 120 | 3835 | brass: 50 nm | 3 | diamond | 35 | Ti: 50 nm | Ni: 3 μm | |
| 4-2 | S5 | 120 | 4020 | brass: 50 nm | 3 | diamond | 35 | Ti: 50 nm | Ni: 3 μm | |
| 4-3 | S6 | 120 | 4314 | brass: 50 nm | 3 | diamond | 35 | Ti: 50 nm | Ni: 3 μm | |
| 4-4 | S8 | 120 | 4073 | brass: 50 nm | 3 | diamond | 35 | Ti: 50 nm | Ni: 3 μm | |
| 4-5 | S7 | 120 | 4509 | brass: 50 nm | 3 | diamond | 35 | Ti: 50 nm | Ni: 3 μm | |
| 4-6 | S7 | 120 | 4509 | brass: 50 nm | 3 | diamond | 35 | Ti: 50 nm | Ni: 3 μm | |
| 4-7 | S5 | 120 | 4020 | brass: 50 nm | 3 | diamond | 35 | Ti: 50 nm | Ni: 3 μm | |
| 4-8 | S5 | 120 | 4020 | brass: 50 nm | 3 | diamond | 35 | Ti: 50 nm | Ni: 3 μm | |
| 4-9 | S5 | 120 | 4020 | brass: 50 nm | 3 | diamond | 35 | Ti: 50 nm | Ni: 3 μm | |
| 4-10 | S3 | 100 | 4528 | brass: 50 nm | 3 | diamond | 40 | Ti: 50 nm | Ni: 4 μm | |
| 4-11 | S9 | 100 | 4315 | brass: 50 nm | 3 | diamond | 40 | Ti: 50 nm | Ni: 4 μm | |
| 4-12 | S10 | 100 | 3826 | brass: 50 nm | 3 | diamond | 40 | Ti: 50 nm | Ni: 4 μm | |
| 4-13 | S5 | 120 | 4020 | brass: 50 nm | 3 | diamond | 35 | none | Ni: 3 μm | |
| 4-14 | S5 | 120 | 4020 | brass: 50 nm | none | diamond | 35 | Ti: 50 nm | Ni: 3 μm | |
| 4-15 | S8 | 120 | 4315 | brass: 50 nm | 3 | diamond | 30 | Ti: 50 nm | Ni: 5 μm | |
| 4-16 | S4 | 120 | 3835 | brass: 50 nm | 3 | diamond | 35 | Ti: 50 nm | Ni: 3 μm | |
| 4-17 | S2 | 100 | 4329 | none | 3 | diamond | 35 | Ti: 50 nm | Ni: 3 μm | |
| 4-18 | S3 | 100 | 4528 | brass: 50 nm | 3 | GC | 35 | Ti: 50 nm | Ni: 3 μm | |
| 4-19 | S18 | 120 | 4000 | brass: 50 nm | 3 | diamond | 35 | none | Ni: 3 μm | |
| 4-20 | S17 | 120 | 3805 | brass: 50 nm | 3 | diamond | 35 | Ti: 50 nm | Ni: 3 μm | |
| 4-21 | S6 | 120 | 4314 | brass: 50 nm | 3 | diamond | 35 | Ti: 50 nm | Ni: 0.5 μm | |
| 4-22 | S6 | 120 | 4314 | brass: 50 nm | 3 | diamond | 35 | Ti: 50 nm | Ni: 6 μm | |
| 4-23 | S14 | 160 | 3409 | brass: 50 nm | 3 | diamond | 35 | Ti: 50 nm | Cu: 3 μm | comparative |
| 4-24 | S13 | 160 | 3350 | brass: 50 nm | 3 | diamond | 35 | Ti: 50 nm | Cu: 3 μm | example |
| 4-25 | S12 | 160 | 3236 | brass: 50 nm | 3 | diamond | 35 | Ti: 50 nm | Cu: 3 μm | |
| 4-26 | S12 | 160 | 3236 | brass: 50 nm | none | diamond | 35 | none | Cu: 3 μm | |
| 4-27 | S5 | 120 | 4020 | brass: 50 nm | 3 | diamond | 35 | Ti: 50 nm | Ni: 5 μm | |
| 4-28 | S5 | 120 | 4020 | brass: 50 nm | 3 | diamond | 35 | Ti: 50 nm | Ni: 3 μm | |
| 4-29 | Inconel718 | 250 | 1000 | none | none | diamond | 20 | none | Cu: 3 μm | |
| 4-30 | S1 | 100 | 3817 | brass: 50 nm | 3 | diamond | 35 | none | Cu: 3 μm | |
| 4-31 | S11 | 160 | 3117 | brass: 50 nm | 3 | diamond | 35 | Ti: 50 nm | Ni: 3 μm | |
| 4-32 | SUS304 | 200 | 1200 | none | 3 | diamond | 35 | Ti: 50 nm | Cu: 3 μm | |

TABLE 3

| test No. | solder of fixing part composition (mass %) | | | | diameter (μm) | paste mixture composition (mass ratio) abrasive:solder:flux | note |
|---|---|---|---|---|---|---|---|
| | Sn | Ag | Cu | Others | | | |
| 1 | 96.5 | 3.4 | 0 | Fe: 0.05 + Ni: 0.05 | 30 | 3:2:4 | example of present invention |
| 2 | 96.5 | 3.0 | 0.45 | Ni: 0.05 | 30 | 3:2:3 | |
| 3 | 94.0 | 5.0 | 0.95 | Fe: 0.05 | 30 | 2:2:3 | |
| 4-1 | 99.4 | 0.5 | 0 | Fe: 0.05 + Ni: 0.05 | 30 | 3:2:4 | |
| 4-2 | 98.9 | 1.0 | 0 | Fe: 0.05 + Ni: 0.05 | 30 | 3:2:4 | |
| 4-3 | 96.5 | 4.4 | 0 | Fe: 0.05 + Ni: 0.05 | 30 | 3:2:4 | |
| 4-4 | 95.0 | 4.9 | 0 | Fe: 0.05 + Ni: 0.05 | 30 | 3:2:4 | |
| 4-5 | 96.5 | 3.495 | 0 | Ni: 0.005 | 30 | 3:2:4 | |
| 4-6 | 96.5 | 3.47 | 0 | Ni: 0.03 | 30 | 3:2:4 | |
| 4-7 | 96.5 | 3.45 | 0 | Ni: 0.05 | 30 | 3:2:4 | |
| 4-8 | 96.2 | 3.4 | 0 | Ni: 0.4 | 30 | 3:2:4 | |
| 4-9 | 95.9 | 3.4 | 0 | Ni: 0.7 | 30 | 3:2:4 | |
| 4-10 | 95.0 | 4.0 | 0 | Ba: 1.0 | 30 | 3:2:3 | |
| 4-11 | 95.0 | 4.0 | 0 | B: 1.0 | 30 | 2:2:3 | |
| 4-12 | 95.0 | 4.0 | 0 | Mo: 1.0 | 30 | 2:2:3 | |
| 4-13 | 96.4 | 3.5 | 0 | Fe: 0.05 + Ni: 0.05 | 30 | 2:2:3 | |
| 4-14 | 96.5 | 3.5 | 0 | 0 | 30 | 3:2:3 | |
| 4-15 | 96.4 | 3 | 0.5 | Fe: 0.05 + Ni: 0.05 | 25 | 3:2:3 | |
| 4-16 | 96.5 | 3.45 | 0 | Fe: 0.05 | 30 | 3:2:3 | |
| 4-17 | 96.5 | 3.0 | 0.5 | 0 | 30 | 3:2:4 | |
| 4-18 | 96.5 | 3.0 | 0.5 | 0 | 30 | 3:2:4 | |
| 4-19 | 98.9 | 1.0 | 0 | Fe: 0.05 + Ni: 0.05 | 30 | 3:2:4 | |
| 4-20 | 96.5 | 3.45 | 0 | Fe: 0.05 | 30 | 3:2:3 | |
| 4-21 | 96.5 | 4.4 | 0 | Fe: 0.05 + Ni: 0.05 | 30 | 3:2:4 | |
| 4-22 | 96.5 | 4.4 | 0 | Fe: 0.05 + Ni: 0.05 | 30 | 3:2:4 | |
| 4-23 | 99.6 | 0.3 | 0 | Fe: 0.05 + Ni: 0.05 | 30 | 3:2:4 | comparative example |
| 4-24 | 93.9 | 6.0 | 0 | Fe: 0.05 + Ni: 0.05 | 30 | 3:2:4 | |
| 4-25 | 96.5 | 3.0 | 0.5 | 0 | 30 | 3:2:4 | |
| 4-26 | 96.5 | 3.0 | 0.5 | 0 | 30 | 3:2:4 | |
| 4-27 | 98.5 | 0 | 1.45 | Ni: 0.05 | 25 | 3:2:3 | |
| 4-28 | 96.5 | 0 | 3.5 | 0 | 30 | 3:2:3 | |
| 4-29 | 95.0 | 4.4 | 0.6 | 0 | 45 | 3:2:3 | |
| 4-30 | 98.5 | 0 | 2.0 | 0 | 30 | 3:2:4 | |
| 4-31 | 93.9 | 6.0 | 0 | Fe: 0.05 + Ni: 0.05 | 30 | 3:2:4 | |
| 4-32 | 96.5 | 3.0 | 0.5 | 0 | 30 | 3:2:4 | |

TABLE 4

| test No. | heat treatment condition | | cutting condition | | | | off state of abrasive | note |
|---|---|---|---|---|---|---|---|---|
| | temperature (° C.) | speed (m/min) | working load (g) | tension (MPa) | speed (m/min) | cutting speed (mm/min) | | |
| 1 | 270 | 0.1 | 100 | 20 | 400 | 9.9 | ◎ | example of present invention |
| 2 | 270 | 0.1 | 100 | 20 | 400 | 9.1 | ◎ | |
| 3 | 280 | 0.15 | 100 | 20 | 400 | 8.4 | ◎ | |
| 4-1 | 270 | 0.1 | 100 | 20 | 400 | 8 | ○ | |
| 4-2 | 270 | 0.1 | 100 | 20 | 400 | 9.9 | ◎ | |
| 4-3 | 270 | 0.1 | 100 | 20 | 400 | 9.9 | ◎ | |
| 4-4 | 270 | 0.1 | 100 | 20 | 400 | 8 | ○ | |
| 4-5 | 270 | 0.1 | 100 | 20 | 400 | 9.9 | ◎ | |
| 4-6 | 270 | 0.1 | 100 | 20 | 400 | 8.7 | ◎ | |
| 4-7 | 270 | 0.1 | 100 | 20 | 400 | 9.9 | ◎ | |
| 4-8 | 270 | 0.1 | 100 | 20 | 400 | 9.9 | ◎ | |
| 4-9 | 270 | 0.1 | 100 | 20 | 400 | 8.4 | ◎ | |

TABLE 4-continued

| | heat treatment condition | | cutting condition working | | | cutting | off | |
|---|---|---|---|---|---|---|---|---|
| test No. | temperature (° C.) | speed (m/min) | load (g) | tension (MPa) | speed (m/min) | speed (mm/min) | state of abrasive | note |
| 4-10 | 280 | 0.15 | 100 | 20 | 400 | 6.8 | ○ | |
| 4-11 | 280 | 0.15 | 100 | 20 | 400 | 6.8 | ○ | |
| 4-12 | 280 | 0.15 | 100 | 20 | 400 | 6.8 | ○ | |
| 4-13 | 270 | 0.1 | 100 | 20 | 400 | 8 | ○ | |
| 4-14 | 270 | 0.1 | 100 | 20 | 400 | 7.6 | ○ | |
| 4-15 | 270 | 0.1 | 100 | 20 | 400 | 8.4 | ⊚ | |
| 4-16 | 270 | 0.1 | 100 | 20 | 400 | 8 | ○ | |
| 4-17 | 270 | 0.1 | 100 | 20 | 400 | 6.8 | ○ | |
| 4-18 | 280 | 0.1 | 100 | 20 | 400 | 5.9 | ○ | |
| 4-19 | 270 | 0.1 | 100 | 20 | 400 | 7.5 | ○ | |
| 4-20 | 270 | 0.1 | 100 | 20 | 400 | 7.2 | ○ | |
| 4-21 | 270 | 0.1 | 100 | 20 | 400 | 7.6 | ○ | |
| 4-22 | 270 | 0.1 | 100 | 20 | 400 | 7.4 | ○ | |
| 4-23 | 270 | 0.1 | 100 | 20 | 400 | 5.3 | Δ | comparative example |
| 4-24 | 270 | 0.1 | 100 | 20 | 400 | 5.3 | Δ | |
| 4-25 | 290 | 0.1 | 100 | 20 | 400 | 5.3 | Δ | |
| 4-26 | 290 | 0.07 | 100 | 20 | 400 | 4.9 | Δ | |
| 4-27 | 270 | 0.1 | 100 | 20 | 400 | 1.2 | X | |
| 4-28 | 270 | 0.1 | 100 | 20 | 400 | 1 | X | |
| 4-29 | 350 | 1 | 100 | 20 | 400 | 1.9 | Δ | |
| 4-30 | 270 | 0.1 | 100 | 20 | 400 | 0.8 | X | |
| 4-31 | 270 | 0.1 | 100 | 20 | 400 | 5.3 | Δ | |
| 4-32 | 270 | 0.1 | 100 | 20 | 400 | 4.3 | Δ | |

Example 5

In an example 5, a steel wire in which a surface of a steel strand was covered with brass with an about 50 nm thickness was used. As the steel strand, steel strand No. S7 was used. As presented in Table 1, tensile strength of the steel strand No. S7 was 4509 MPa. Composition of brass was "Cu:Zn=2:1" in terms of mol ratio. A diameter of the steel wire was set to 120 μm. As an abrasive, used was a diamond abrasive covered with a covering layer in which a Ti plating layer was located on an inner side and a Ni plating layer was located on an outer side. A thickness of the Ti plating layer was 50 nm and a thickness of the Ni plating layer was 3 μm. An average diameter of the diamond abrasive was 25 μm. As a solder of a fixing part, a Sn—Zn—Bi-based solder was used. In the Sn—Zn—Bi-based solder, a Sn content was 89 mass %, a Zn content was 8 mass %, and a Bi content was 3 mass %. As the Sn—Zn—Bi-based solder, a solder ball with a 30 μm average diameter was used.

In the manufacture of a saw wire, the aforesaid diamond abrasive and Sn—Zn—Bi-based solder and a flux containing zinc halide were mixed and stirred, whereby a paste mixture was fabricated. Here, a ratio of the Sn—Zn—Bi-based solder, the abrasive, and the flux was "Sn—Zn—Bi-based solder: abrasive:flux=3:2:3" in terms of mass ratio.

Further, the steel wire was subjected to acetone washing and thereafter was coated with a solder with an about 3 μm thickness. In this solder coating, the steel wire was made to pass at a speed of 50 cm/second in a Sn—Zn—Bi-based solder containing Sn: 89 mass %, Zn: 8 mass %, and Bi: 3 mass % and melted at 290° C., and a surplus portion of the Sn—Zn—Bi-based solder was wiped off.

Then, after the solder coating, the steel wire was made to pass in a container containing the aforesaid paste mixture, and thereafter, was drawn out from a tip of a nozzle having a hole with an about 300 μm diameter. In this manner, a surface of the steel wire was coated with the paste mixture with a predetermined thickness. Subsequently, the steel wire coated with the paste mixture was made to pass at a speed of 0.1 m/minute in a tubular electric furnace which was heated to 280° C. and whose soaking zone had an about 40 cm length, whereby the solder was melted. Next, the solder was solidified by cooling outside the tubular electric furnace, so that the abrasive was fixed to the steel wire. Thereafter, the steel wire was made to pass in a cleaning tank, where a surplus flux component was removed. In this manner, the saw wire was produced. The produced saw wire was taken up by a reel.

Figure 3A:
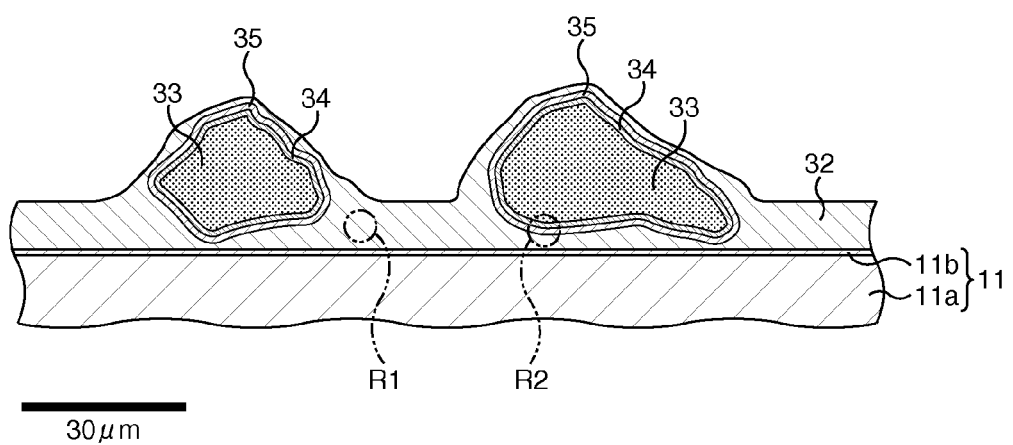
FIG. 3A is a cross-sectional view illustrating a saw wire obtained in an example 5.
Figure 3B:
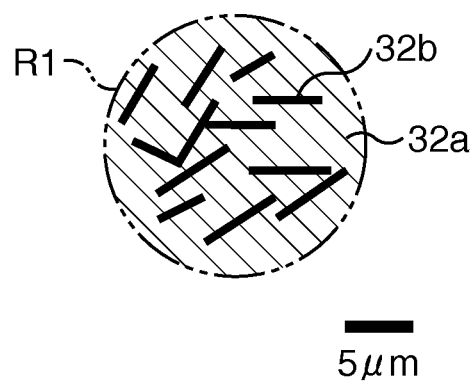
FIG. 3B is an enlarged view of a region R1 in FIG. 3A.
Figure 3C:
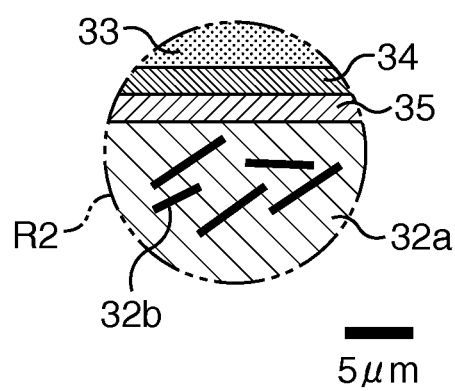
FIG. 3C is an enlarged view of a region R2 in FIG. 3A.

A texture around the abrasive of the obtained saw wire was observed. Schematic views of this texture are illustrated in FIG. 3A to FIG. 3C. FIG. 3B is an enlarged view of a region R1 in FIG. 3A, and FIG. 3C is an enlarged view of a region R2 in FIG. 3A. From element analysis, it was seen that a Ni plating layer 34 with a 1 μm to 2 μm thickness existed around the diamond abrasive 33, and a layer 35 of Sn—Ni—Zn-based intermetallic compounds with an about 1 μm thickness distributed around the Ni plating layer 34. Further, in a solder matrix 32a, there was confirmed a texture in which Zn 32b in a plate shape having an about 1 μm to 2 μm thickness or in a strip shape having an about 1 μm to 2 μm diameter was dispersed.

Further, cutting performance of such a saw wire was evaluated. In this evaluation, a length of the saw wire was 30 m, tension applied to the saw wire was set to 20 N, a moving speed of the saw wire was set to 400 m/minute, and a working load was set to 100 gf, and a silicon single crystal with a 20 mm diameter was cut while the saw wire was reciprocated. Further, water was used as a cooling solvent. At this time, a cutting speed was 12.8 mm/minute, which was high enough. Further, during the cutting of the silicon single crystal, almost no exfoliation of the abrasive from the saw wire was confirmed and thus a fixing state was good.

From these results, it is apparent that under the conditions in the example 5, a solder-fixing-type saw wire excellent in cutting performance can also be obtained.

Example 6

In an example 6, a steel wire in which a surface of a steel strand was covered with copper with an about 50 nm thickness was used. As the steel strand, steel strand No. S1 was used. As presented in Table 1, tensile strength of the steel strand No. S1 was 3817 MPa. A diameter of the steel wire was mad 100 μm. As the abrasive, used was a diamond abrasive covered with a covering layer in which a Ti plating layer was located on an inner side and a Ni plating layer was located on an outer side. A thickness of the Ti plating layer was 50 nm and a thickness of the Ni plating layer was 4 μm. An average diameter of the diamond abrasive was 20 μm. As a solder of a fixing part, a Sn—Zn-based solder was used. In the Sn—Zn-based solder, a Sn content was 91 mass % and a Zn content was 9 mass %. As the Sn—Zn-based solder, a solder ball with a 30 μm average diameter was used.

In the manufacture of a saw wire, the aforesaid diamond abrasive and Sn—Zn-based solder and a flux containing zinc halide were mixed and stirred, whereby a paste mixture was fabricated. Here, a ratio of the Sn—Zn-based solder, the abrasive, and the flux was "Sn—Zn-based solder:abrasive:flux=2:2:3" in terms of mass ratio.

Further, the steel wire was subjected to acetone washing and thereafter was coated with a solder with an about 3 μm thickness. In this solder coating, the steel wire was made to pass at a speed of 50 cm/second in an Sn—Zn-based solder containing Sn: 91.0 mass % and Zn: 9.0 mass % and melted at 250° C., and a surplus portion of the Sn—Zn-based solder was wiped off.

Then, after the solder coating, the steel wire was made to pass in a container containing the aforesaid paste mixture, and thereafter, was drawn out from a tip of a nozzle having a hole with an about 350 μm diameter. In this manner, a surface of the steel wire was coated with the paste mixture with a predetermined thickness. Subsequently, the steel wire coated with the paste mixture was made to pass at a speed of 0.15 m/minute in a tubular electric furnace which was heated to 280° C. and whose soaking zone had an about 40 cm length, whereby the solder was melted. Next, the solder was solidified by cooling outside the tubular electric furnace, so that the abrasive was fixed to the steel wire. Thereafter, the steel wire was made to pass in a cleaning tank, whereby a surplus flux component was removed. In this manner, the saw wire was produced. The produced saw wire was taken up by a reel.

A texture around the abrasive of the obtained saw wire was observed. From element analysis, it was seen that a Ni plating layer with a 1 μm to 2 μm thickness existed around the diamond abrasive, and around the Ni plating layer, Sn—Ni—Cu-based intermetallic compounds distributed in an about 1 μm thickness. Further, in a solder matrix, there was confirmed a texture in which Zn in a plate shape having an about 1 μm to 2 μm thickness or in a strip shape having an about 1 μm to 2 μm diameter was dispersed.

Further, cutting performance of such a saw wire was evaluated under the same conditions as those of the example 5. At this time, a cutting speed was 12.4 mm/minute, which was high enough. Further, during the cutting of a silicon single crystal, almost no exfoliation of the abrasive from the saw wire was confirmed and thus a fixing state was good.

From these results, it is apparent that under the conditions in the example 6, a solder-fixing-type saw wire excellent in cutting performance can also be obtained.

Example 7

Saw wires were fabricated under various conditions presented in the following Table 5, Table 6, and Table 7 in accordance with the example 5 and the example 6, and their cutting performances were compared. Table 5 presents structures of their steel wires and abrasives. Table 6 presents structures of their ball-shaped (spherical) solders each used in a fixing part and of paste mixtures each containing this solder. Table 7 presents conditions of heat treatment for melting the solders with a tubular electric furnace, conditions when a silicon single crystal was cut, and evaluation results of exfoliation states of the abrasives. In Table 7, "GC" represents green silicon carbide and "WA" represents white alumina. The evaluation of the exfoliation states of the abrasives was conducted in the same manner as in the example 4.

Further, a texture around the abrasive of each of the obtained saw wires was observed, and it was found that a Ni-plating metal layer with a 1 μm to 2 μm thickness exited around the abrasive, and around the Ni-plating metal layer, Sn—Ni—Zn-based intermetallic compounds distributed in a 1 μm thickness, in the examples of the present invention except tests No. 7-6 and No. 7-25. Further, in test No. 7-18, intermetallic compounds represented by $BaSnO_3$ were observed around the abrasive. In test 7-19, Pt—Sn—Ni based intermetallic compounds were observed around the abrasive. In test No. 7-4, Sn—Ni—In-based intermetallic compounds were observed. In tests No. 7-6 and No. 7-25, a Cu-plating metal layer with a thickness of 1 μm to 2 μm existed around the diamond abrasive, and around the Cu-plating metal layer, Sn—Cu—Zn-based intermetallic compounds distributed in an about 2 μm to 3 μm thickness.

Note that tests No. 5 and No. 6 in Table 5 to Table 7 are the above-described example 5 and example 6 respectively.

From these results, it is apparent that under the conditions of tests No. 7-1 to No. 7-29, fixed-abrasive saw wires of a solder-fixing type excellent in cutting performance could be obtained as in the example 5 and the example 6.

Test No. 7-35 being a comparative example is a saw wire produced on an experimental basis by a method similar to a manufacturing method described in "example 3" of Patent Literature 4 (Patent No. 4008660). Test No. 7-39 being a comparative example is a saw wire using a commercially available diamond Ni-electrodeposited wire (manufactured by Diamond Wire Technology, nominal value φ200 μm).

As presented in Table 5 to Table 7, it is apparent that the abrasive-fixed saw wires of tests No. 1 to No. 7-29, being the examples of the present invention, which use Sn—Zn-based solders are superior in cutting performance to the saw wires of tests No. 7-30 to No. 7-39 being the comparative examples.

TABLE 5

| | | steel wire | | | | abrasive | | | |
|---|---|---|---|---|---|---|---|---|---|
| test No. | steel strand No. | diameter (μm) | tensile strength (MPa) | plating layer | thickness of solder (μm) | material | diameter (μm) | covering layer inner | covering layer outer | note |
| 5 | S7 | 120 | 4509 | brass: 50 nm | 3 | diamond | 25 | Ti: 50 nm | Ni: 3 μm | example of |
| 6 | S1 | 100 | 3817 | copper: 50 nm | 3 | diamond | 20 | Ti: 50 nm | Ni: 4 μm | present |
| 7-1 | S2 | 100 | 4329 | zinc: 50 nm | 3 | diamond | 20 | Ti: 50 nm | Ni: 4 μm | invention |

TABLE 5-continued

| | | steel wire | | | | abrasive | | | |
| test No. | steel strand No. | diameter (μm) | tensile strength (MPa) | plating layer | thickness of solder (μm) | material | diameter (μm) | covering layer inner | covering layer outer | note |
|---|---|---|---|---|---|---|---|---|---|---|
| 7-2 | S3 | 100 | 4528 | brass: 50 nm | 3 | diamond | 25 | none | Ni: 3 μm | |
| 7-3 | S4 | 120 | 3835 | brass: 50 nm | none | diamond | 25 | Ti: 50 nm | Ni: 3 μm | |
| 7-4 | S5 | 120 | 4020 | brass: 50 nm | none | diamond | 25 | Ti: 50 nm | Ni: 3 μm | |
| 7-5 | S5 | 120 | 4020 | brass: 50 nm | 3 | diamond | 25 | Ti: 50 nm | Ni: 5 μm | |
| 7-6 | S4 | 120 | 3835 | brass: 50 nm | 3 | diamond | 25 | Ti: 50 nm | Cu: 5 μm | |
| 7-7 | S3 | 100 | 4528 | copper: 50 nm | 3 | diamond | 20 | Ti: 50 nm | Ni: 4 μm | |
| 7-8 | S3 | 100 | 4528 | brass: 50 nm | 3 | diamond | 20 | Ti: 50 nm | Ni: 4 μm | |
| 7-9 | S5 | 120 | 4020 | none | 3 | diamond | 25 | Cr: 50 nm | Ni: 3 μm | |
| 7-10 | S5 | 120 | 4020 | zinc: 50 nm | 3 | diamond | 25 | Cr: 50 nm | Ni: 3 μm | |
| 7-11 | S4 | 120 | 3835 | brass: 50 nm | 3 | GC | 25 | Ti: 50 nm | Ni: 3 μm | |
| 7-12 | S4 | 120 | 3835 | brass: 50 nm | 3 | WA | 25 | Ti: 50 nm | Ni: 3 μm | |
| 7-13 | S10 | 100 | 3826 | copper: 50 nm | 3 | diamond | 20 | Ti: 50 nm | Ni: 4 μm | |
| 7-14 | S10 | 100 | 3826 | brass: 50 nm | 3 | diamond | 20 | Ti: 50 nm | Ni: 4 μm | |
| 7-15 | S9 | 100 | 4315 | copper: 50 nm | 3 | diamond | 20 | Ti: 50 nm | Ni: 4 μm | |
| 7-16 | S9 | 100 | 4315 | brass: 50 nm | 3 | diamond | 20 | Ti: 50 nm | Ni: 4 μm | |
| 7-17 | S2 | 100 | 4329 | copper: 50 nm | 3 | diamond | 20 | Ti: 50 nm | Ni: 4 μm | |
| 7-18 | S8 | 120 | 4073 | zinc: 50 nm | 3 | diamond | 25 | Cr: 50 nm | Ni: 3 μm | |
| 7-19 | S8 | 120 | 4073 | zinc: 50 nm | 3 | diamond | 25 | Cr: 50 nm | Ni: 3 μm | |
| 7-20 | S8 | 120 | 4073 | zinc: 50 nm | 3 | diamond | 25 | Cr: 50 nm | Ni: 3 μm | |
| 7-21 | S7 | 120 | 4509 | brass: 50 nm | 3 | diamond | 25 | Ti: 50 nm | Ni: 3 μm | |
| 7-22 | S7 | 120 | 4509 | brass: 50 nm | 3 | diamond | 25 | Ti: 50 nm | Ni: 3 μm | |
| 7-23 | S7 | 120 | 4509 | brass: 50 nm | 3 | diamond | 25 | Ti: 50 nm | Ni: 3 μm | |
| 7-24 | S7 | 120 | 4509 | brass: 50 nm | 3 | diamond | 25 | Ti: 50 nm | Ni: 3 μm | |
| 7-25 | S4 | 120 | 3835 | brass: 50 nm | 3 | diamond | 25 | none | Cu: 3 μm | |
| 7-26 | S17 | 120 | 3805 | brass: 50 nm | none | diamond | 25 | Ti: 50 nm | Ni: 3 μm | |
| 7-27 | S18 | 120 | 4000 | zinc: 50 nm | 3 | diamond | 25 | Cr: 50 nm | Ni: 3 μm | |
| 7-28 | S3 | 100 | 4528 | brass: 50 nm | 3 | diamond | 25 | none | Ni: 0.5 μm | |
| 7-29 | S3 | 100 | 4528 | brass: 50 nm | 3 | diamond | 25 | none | Ni: 6 μm | |
| 7-30 | S11 | 160 | 3012 | brass: 50 nm | 3 | diamond | 25 | Ti: 50 nm | Ni: 3 μm | comparative example |
| 7-31 | S12 | 160 | 3117 | brass: 50 nm | 3 | diamond | 25 | Ti: 50 nm | Cu: 3 μm | |
| 7-32 | S13 | 160 | 3236 | brass: 50 nm | 3 | diamond | 25 | Ti: 50 nm | Cu: 3 μm | |
| 7-33 | S14 | 160 | 3350 | brass: 50 nm | none | diamond | 25 | none | Ni: 3 μm | |
| 7-34 | S15 | 160 | 3409 | brass: 50 nm | 3 | diamond | 25 | none | Cu: 3 μm | |
| 7-35 | Inconel718 | 250 | 1000 | none | none | diamond | 20 | none | Cu: 3 μm | |
| 7-36 | SUS304 | 200 | 1200 | none | 3 | GC | 25 | none | Cu: 3 μm | |
| 7-37 | S16 | 150 | 3443 | none | 3 | WA | 25 | none | Ni: 3 μm | |
| 7-38 | SUS316 | 200 | 1300 | none | 3 | diamond | 25 | Ti: 50 nm | Ni: 3 μm | |
| 7-39 | Ni electrodeposited wire | 200 | 3400 | none | Ni: 35 μm | diamond | 20 | none | Ni: 3 μm | |

TABLE 6

| | solder of fixing part | | | | paste mixture composition | |
|---|---|---|---|---|---|---|
| test No. | composition (mass %) Sn | Zn | Others | diameter (μm) | (mass ratio) abrasive:solder:flux | note |
| 5 | 89 | 8 | Bi: 3 | 30 | 3:2:3 | example of present invention |
| 6 | 91 | 9 | 0 | 30 | 2:2:3 | |
| 7-1 | 91 | 9 | 0 | 30 | 2:2:3 | |
| 7-2 | 89 | 8 | Bi: 3 | 30 | 3:2:4 | |
| 7-3 | 90 | 9 | Sb: 1 | 30 | 3:2:3 | |
| 7-4 | 87 | 9 | In: 4 | 30 | 3:2:3 | |
| 7-5 | 89 | 9 | Bi: 2 | 25 | 3:2:3 | |
| 7-6 | 89 | 8 | Bi: 3 | 25 | 3:2:3 | |
| 7-7 | 96 | 4 | 0 | 30 | 2:2:3 | |
| 7-8 | 71 | 29 | 0 | 30 | 2:2:3 | |
| 7-9 | 89 | 8 | Bi: 3 | 30 | 3:3:2 | |
| 7-10 | 93 | 6.2 | Ni: 0.8 | 30 | 3:2:3 | |
| 7-11 | 97 | 2.4 | Fe: 0.6 | 30 | 3:2:3 | |
| 7-12 | 89 | 8 | Bi: 3 | 30 | 3:2:3 | |
| 7-13 | 99.5 | 0.5 | 0 | 30 | 2:2:3 | |
| 7-14 | 64 | 36 | 0 | 30 | 2:2:3 | |
| 7-15 | 88 | 12 | 0 | 30 | 2:2:3 | |
| 7-16 | 87 | 13 | 0 | 30 | 2:2:3 | |
| 7-17 | 95 | 5 | 0 | 30 | 2:2:3 | |

TABLE 6-continued

| | solder of fixing part | | | paste mixture composition | |
|---|---|---|---|---|---|
| test No. | composition (mass %) | | diameter | (mass ratio) | note |
| | Sn | Zn | Others | (μm) | abrasive:solder:flux | |
| 7-18 | 93 | 5 | Ba: 2 | 30 | 3:2:3 | |
| 7-19 | 92 | 6 | Pt: 2 | 30 | 3:2:3 | |
| 7-20 | 90 | 6 | As: 4 | 30 | 3:2:3 | |
| 7-21 | 92 | 7.6 | Bi: 0.4 | 30 | 3:2:3 | |
| 7-22 | 92 | 7.5 | Bi: 0.5 | 30 | 3:2:3 | |
| 7-23 | 87 | 8 | Bi: 5 | 30 | 3:2:3 | |
| 7-24 | 86 | 8 | Bi: 6 | 30 | 3:2:3 | |
| 7-25 | 89 | 8 | Bi: 3 | 30 | 3:2:4 | |
| 7-26 | 90 | 9 | Sb: 1 | 30 | 3:2:3 | |
| 7-27 | 93 | 6.2 | Ni: 0.8 | 30 | 3:2:3 | |
| 7-28 | 89 | 8 | Bi: 3 | 30 | 3:2:4 | |
| 7-29 | 89 | 8 | Bi: 3 | 30 | 3:2:4 | |
| 7-30 | 42 | 0 | Bi: 58 | 30 | 3:2:3 | comparative example |
| 7-31 | 63 | 0 | Pb: 37 | 30 | 3:2:3 | |
| 7-32 | 95 | 0 | Sb: 5 | 30 | 3:2:4 | |
| 7-33 | 99.3 | 0 | Cu: 0.7 | 30 | 3:2:3 | |
| 7-34 | 96 | 0 | Ag: 3.5 + Cu: 0.5 | 30 | 3:2:4 | |
| 7-35 | 95 | 0 | Ag: 4 + Cu: 1 | 45 | 3:2:3 | |
| 7-36 | 96.5 | 0 | Ag: 3.5 | 30 | 3:2:3 | |
| 7-37 | 63 | 0 | Pb: 37 | 30 | 3:2:3 | |
| 7-38 | 63 | 0 | Pb: 37 | 30 | 3:2:4 | |
| 7-39 | | | none | | | |

TABLE 7

| | heat treatment condition | | cutting condition | | | | | |
|---|---|---|---|---|---|---|---|---|
| | | | working | | | cutting | off | |
| test No. | temperature (° C.) | speed (m/min) | load (g) | tension (MPa) | speed (m/min) | speed (mm/min) | state of abrasive | note |
| 5 | 280 | 0.1 | 100 | 20 | 400 | 12.8 | ☺ | example of present invention |
| 6 | 280 | 0.15 | 100 | 20 | 400 | 12.4 | ☺ | |
| 7-1 | 280 | 0.15 | 100 | 20 | 400 | 12.8 | ☺ | |
| 7-2 | 270 | 0.1 | 100 | 20 | 400 | 11.6 | ☺ | |
| 7-3 | 270 | 0.1 | 100 | 20 | 400 | 12 | ☺ | |
| 7-4 | 270 | 0.1 | 100 | 20 | 400 | 11.2 | ☺ | |
| 7-5 | 270 | 0.1 | 100 | 20 | 400 | 12 | ☺ | |
| 7-6 | 270 | 0.1 | 100 | 20 | 400 | 9.6 | ○ | |
| 7-7 | 280 | 0.15 | 100 | 20 | 400 | 11.6 | ☺ | |
| 7-8 | 310 | 0.08 | 100 | 20 | 400 | 12.4 | ☺ | |
| 7-9 | 350 | 0.1 | 100 | 20 | 400 | 10.8 | ○ | |
| 7-10 | 320 | 0.1 | 100 | 20 | 400 | 11.2 | ○ | |
| 7-11 | 270 | 0.1 | 100 | 20 | 400 | 9.2 | ○ | |
| 7-12 | 270 | 0.1 | 100 | 20 | 400 | 8.4 | ○ | |
| 7-13 | 280 | 0.15 | 100 | 20 | 400 | 10 | ○ | |
| 7-14 | 280 | 0.15 | 100 | 20 | 400 | 10.4 | ○ | |
| 7-15 | 280 | 0.15 | 100 | 20 | 400 | 11.6 | ☺ | |
| 7-16 | 280 | 0.15 | 100 | 20 | 400 | 10.8 | ☺ | |
| 7-17 | 280 | 0.15 | 100 | 20 | 400 | 10.8 | ☺ | |
| 7-18 | 320 | 0.1 | 100 | 20 | 400 | 9.6 | ○ | |
| 7-19 | 320 | 0.1 | 100 | 20 | 400 | 9.2 | ○ | |
| 7-20 | 320 | 0.1 | 100 | 20 | 400 | 9.6 | ○ | |
| 7-21 | 280 | 0.1 | 100 | 20 | 400 | 12 | ☺ | |
| 7-22 | 280 | 0.1 | 100 | 20 | 400 | 12.8 | ☺ | |
| 7-23 | 280 | 0.1 | 100 | 20 | 400 | 12.8 | ☺ | |
| 7-24 | 280 | 0.1 | 100 | 20 | 400 | 12.4 | ☺ | |
| 7-25 | 270 | 0.1 | 100 | 20 | 400 | 9.2 | ○ | |
| 7-26 | 270 | 0.1 | 100 | 20 | 400 | 8.7 | ○ | |
| 7-27 | 320 | 0.1 | 100 | 20 | 400 | 8.8 | ○ | |
| 7-28 | 270 | 0.1 | 100 | 20 | 400 | 9.8 | ○ | |
| 7-29 | 270 | 0.1 | 100 | 20 | 400 | 9.5 | ○ | |
| 7-30 | 270 | 0.1 | 100 | 20 | 400 | 5.6 | X | comparative example |
| 7-31 | 270 | 0.1 | 100 | 20 | 400 | 5.5 | X | |
| 7-32 | 290 | 0.1 | 100 | 20 | 400 | 5.6 | X | |
| 7-33 | 290 | 0.07 | 100 | 20 | 400 | 3.6 | X | |
| 7-34 | 280 | 0.1 | 100 | 20 | 400 | 5.6 | Δ | |
| 7-35 | 350 | 1 | 100 | 20 | 400 | 2 | X | |
| 7-36 | 270 | 0.1 | 100 | 20 | 400 | 5.6 | Δ | |

TABLE 7-continued

| test No. | heat treatment condition | | cutting condition | | | | off |
|---|---|---|---|---|---|---|---|
| | temperature (°C.) | speed (m/min) | working load (g) | tension (MPa) | speed (m/min) | cutting speed (mm/min) | state of abrasive | note |
| 7-37 | 270 | 0.1 | 100 | 20 | 400 | 4.8 | X |
| 7-38 | 270 | 0.1 | 100 | 20 | 400 | 5.2 | X |
| 7-39 | none | | 100 | 20 | 400 | 5.2 | Δ |

From these results of the examples, it is apparent that in the saw wire according to the present invention, only slight exfoliation of the abrasive occurs, and the occurrence of deterioration of cutting speed, a cutting loss (kerf loss), wafer warpage, and so on is reduced, and thus it is excellent in cutting performance.

INDUSTRIAL APPLICABILITY

The present invention is usable in, for example, industries related to saw wires used for cutting various kinds of materials.

The invention claimed is:

1. A saw wire comprising:
a steel wire having a steel strand and a plating layer formed on a surface of the steel strand;
an abrasive fixed to the steel wire by a fixing part; and
an intermetallic compound on an interface between the abrasive and the fixing part, wherein:
the steel strand contains, in mass %,
C: 0.8% to 1.2%,
Si: 0.02% to 2.0%,
Mn: 0.1% to 1.0%,
Cr: 0.5% or less,
P: 0.015% or less,
S: 0.015% or less, and
N: 0.01% or less,
with the balance being Fe and an inevitable impurity;
tensile strength of the steel strand is 3500 MPa or more; and
the fixing part includes an Sn-based solder containing Zn or Ag,
wherein the plating layer gets into the steel strand; and
wherein the Sn-based solder has a melting point of 350° C. or below.

2. The saw wire according to claim 1, wherein the steel strand further contains, in mass %, at least one kind selected from a group consisting of
Ni: 1.0% or less,
Cu: 0.5% or less,
Mo: 0.5% or less,
V: 0.5% or less, and
B: 0.0050% or less.

3. The saw wire according to claim 1, wherein the plating layer contains at least one of Zn and Cu.

4. The saw wire according to claim 3, wherein a getting depth of the plating layer into the steel strand is 0.5 μm to 5 μm.

5. The saw wire according to claim 1 or 4, comprising a covering layer on a surface of the abrasive and including a layer of Ni or Cu.

6. The saw wire according to claim 5, wherein the covering layer comprises a base layer of Ti or Cr provided closer to the abrasive than the layer of Ni or Cu is.

7. The saw wire according to claim 1 or 4, comprising a covering layer on a surface of the abrasive and including a layer of Ni, wherein
the Sn-based solder is a Sn—Ag-based solder containing 0.5 mass % to 5.0 mass % Ag, and
the intermetallic compound contains Sn.

8. The saw wire according to claim 7, wherein the Sn—Ag-based solder contains a $Ag_3Sn$-based intermetallic compound dispersed in a matrix of the Sn—Ag-based solder and having a plate shape with a 1 μm to 2 μm thickness or a string shape with a 1 μm to 2 μm diameter.

9. The saw wire according to claim 7, wherein the Sn—Ag-based solder further contains at least one of Fe: 0.01 mass % to 0.5 mass % and Ni: 0.01 mass % to 0.5 mass %.

10. The saw wire according to claim 7, wherein the intermetallic compound further contains Ni.

11. The saw wire according to claim 10, wherein composition of the intermetallic compound is expressed by $Ni_3Sn_4$, $Ni_3Sn_2$, or $Sn_{(1-x-y)}Ni_xCu_y$ ($0.1 \leq x \leq 0.7$, $0.01 \leq y \leq 0.5$).

12. The saw wire according to claim 1 or 4, wherein
the Sn-based solder is a Sn—Zn-based solder containing Zn, and
the intermetallic compound contains at least one of Sn and Zn.

13. The saw wire according to claim 12, wherein a content of Zn in the Sn—Zn-based solder is 1 mass % to 35 mass %.

14. The saw wire according to claim 12, wherein
composition of the Sn—Zn-based solder is expressed by Sn—Zn—X,
X is at least one kind selected from Bi, Ni, Cu, Fe, Sb, Pb, In, and Ag, and
a content of the X is 0.5 mass % to 5 mass %.

15. The saw wire according to claim 12, wherein the intermetallic compound contains at least one kind selected from a group consisting of a Ni—Sn-based intermetallic compound, a Ni—Zn-based intermetallic compound, a Ni—Sn—Zn-based intermetallic compound, a Cu—Sn-based intermetallic compound, a Cu—Sn—Zn-based intermetallic compound, and a Cu—Zn-based intermetallic compound.

16. The saw wire according to claim 12, wherein the Sn—Zn-based solder includes a Zn precipitate in a plate shape or a needle shape dispersed in a matrix of the Sn—Zn-based solder.

* * * * *